United States Patent
Sohay

(10) Patent No.: US 7,991,820 B1
(45) Date of Patent: Aug. 2, 2011

(54) ONE STEP BINARY SUMMARIZER

(76) Inventor: Leslie Imre Sohay, Bakersfield, CA (US)

( * ) Notice: Subject to any disclaimer, the term of this patent is extended or adjusted under 35 U.S.C. 154(b) by 1029 days.

(21) Appl. No.: 11/890,742

(22) Filed: Aug. 7, 2007

(51) Int. Cl.
*G06F 7/50* (2006.01)

(52) U.S. Cl. .................................... 708/700; 708/671

(58) Field of Classification Search ............... 708/700, 708/703, 671
See application file for complete search history.

(56) References Cited

U.S. PATENT DOCUMENTS

| | | | |
|---|---|---|---|
| 3,602,705 A | | 8/1971 | Cricchi |
| 3,646,332 A | | 2/1972 | Suzuki |
| 3,843,876 A | | 10/1974 | Fette |
| 4,254,471 A | | 3/1981 | Hunt |
| 4,559,608 A | | 12/1985 | Young |
| 4,685,079 A | | 8/1987 | Armer |
| 4,707,800 A | * | 11/1987 | Montrone et al. ............ 708/714 |
| 4,766,565 A | | 8/1988 | Bechade |
| 4,897,808 A | | 1/1990 | Nakagawa |
| 4,942,548 A | | 7/1990 | Vassiliadis |
| 4,970,677 A | | 11/1990 | Young |
| 5,905,662 A | | 5/1999 | Shiraishi |
| 6,140,839 A | * | 10/2000 | Kaviani et al. .................. 326/39 |
| 6,505,226 B1 | | 1/2003 | Ahn |
| 6,781,412 B2 | | 8/2004 | Yoshida |
| 2002/0188641 A1 | | 12/2002 | Yoshida |
| 2003/0028575 A1 | | 2/2003 | Beiu |
| 2003/0158882 A1 | | 8/2003 | Knowles |
| 2004/0021482 A1 | | 2/2004 | Heller |
| 2006/0064455 A1 | | 3/2006 | Schulte |

* cited by examiner

*Primary Examiner* — Chuong Ngo

(57) ABSTRACT

The ONE STEP BINARY SUMMARIZER is a digital logic circuit. It is used for summarizing two binary numbers. It contains one Function Generator Module and one or more SUMMARIZER Units. For subtraction it is subtracting Register "A" from Register "B" and Register "B" from Register "A". The two subtraction and one addition operations are executed simultaneously. The Function Generator Module determines the actual correct operation, (addition or subtraction) and selects the correct results for the resultant operand. The circuit utilizes the subtraction-by-carry method; therefore the subtraction operation does not require any presorting, complementary operations, iterative additions, temporary storage, and multiple instruction sets, etc. The logic-flow is similar, the operational speed is identical for the addition and subtraction operations; and therefore, it is a true Time Symmetrical circuit. It is independent from the initial operation selection, the signs and magnitudes of the input operands.

12 Claims, 17 Drawing Sheets

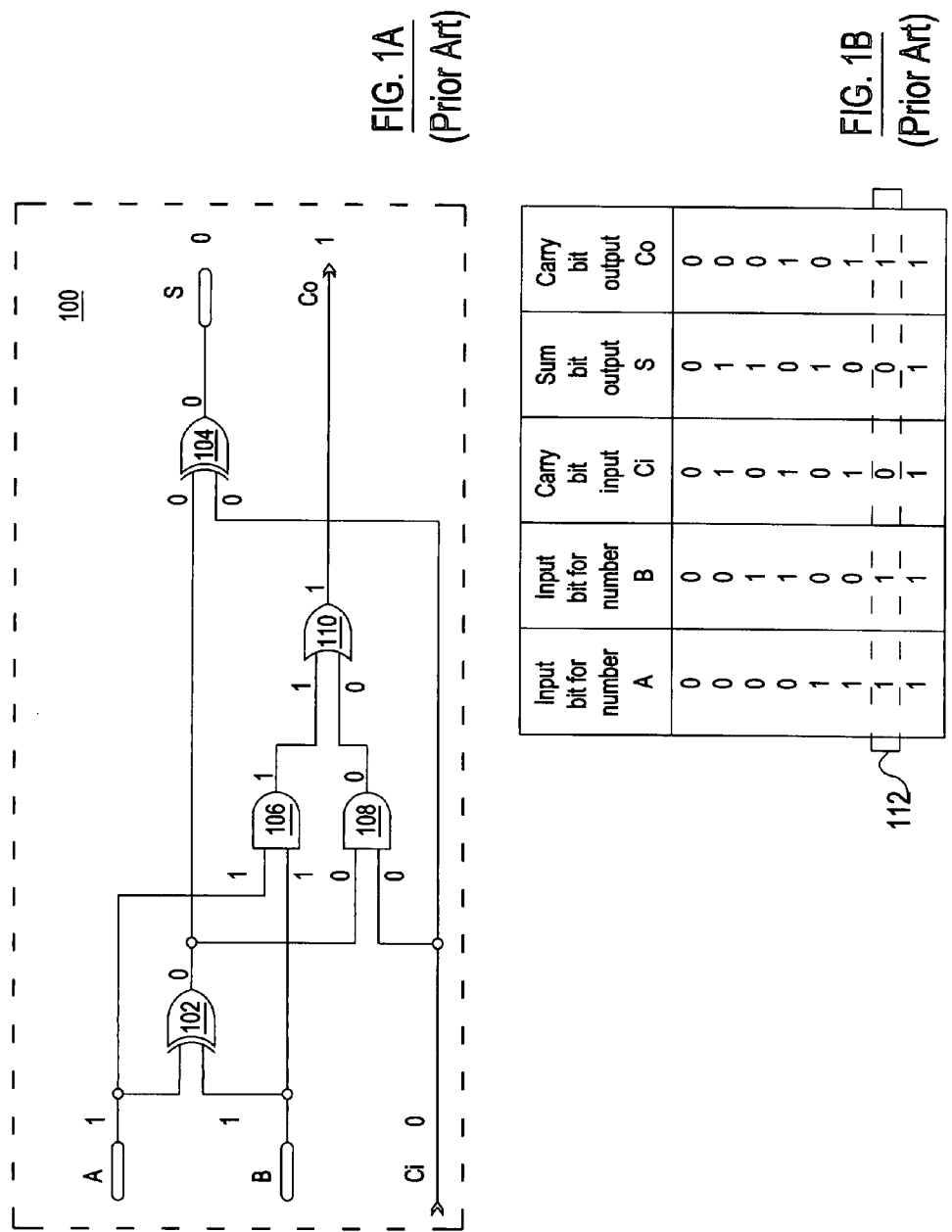

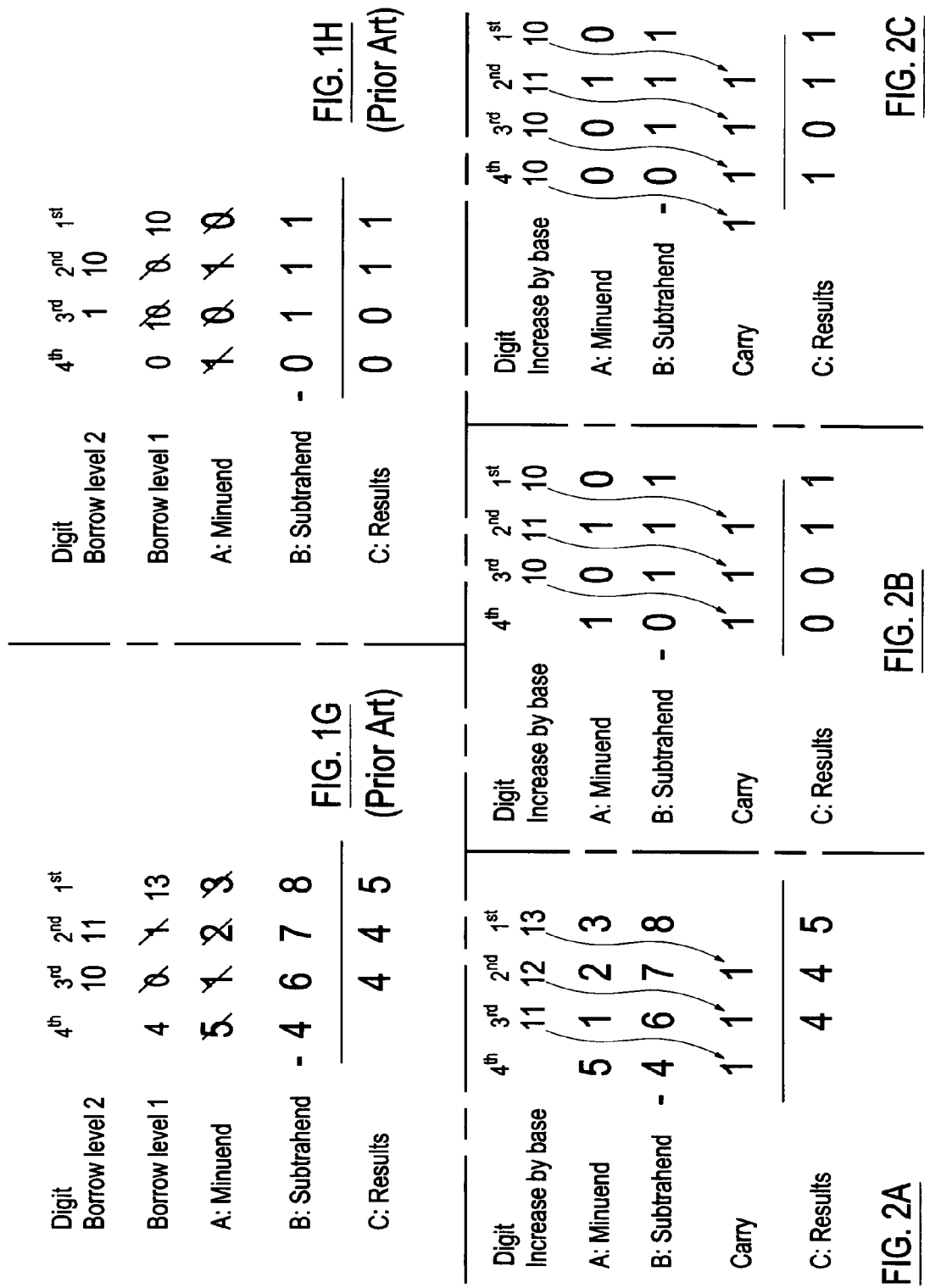

DECIMAL ADDITION TABLE

| X | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 5 | 6 | 7 | 8 | 9 | 10 |
| 2 | 2 | 3 | 4 | 5 | 6 | 7 | 8 | 9 | 10 | 11 |
| 3 | 3 | 4 | 5 | 6 | 7 | 8 | 9 | 10 | 11 | 12 |
| 4 | 4 | 5 | 6 | 7 | 8 | 9 | 10 | 11 | 12 | 13 |
| 5 | 5 | 6 | 7 | 8 | 9 | 10 | 11 | 12 | 13 | 14 |
| 6 | 6 | 7 | 8 | 9 | 10 | 11 | 12 | 13 | 14 | 15 |
| 7 | 7 | 8 | 9 | 10 | 11 | 12 | 13 | 14 | 15 | 16 |
| 8 | 8 | 9 | 10 | 11 | 12 | 13 | 14 | 15 | 16 | 17 |
| 9 | 9 | 10 | 11 | 12 | 13 | 14 | 15 | 16 | 17 | 18 |

— 293

BINARY ADDITION TABLE

| X | 0 | 1 | 10 |
|---|---|---|----|
| 0 | 0 | 1 | X |
| 1 | 1 | 10 | X |
| 10 | X | X | X |

A = MINUEND
B = SUBTRAHEND

| A | B | SUB Carry$_{IN}$ | C | SUB Carry$_{OUT}$ |
|---|---|---|---|---|
| 0 | 0 | 0 | 0 | 0 |
| 0 | 0 | 1 | 1 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |
| 1 | 1 | 0 | 0 | 0 |
| 1 | 1 | 1 | 1 | 1 |

B = MINUEND
A = SUBTRAHEND

| A | B | SUB Carry$_{IN}$ | C | SUB Carry$_{OUT}$ |
|---|---|---|---|---|
| 0 | 0 | 0 | 0 | 0 |
| 0 | 1 | 1 | 1 | 1 |
| 0 | 1 | 0 | 1 | 0 |
| 0 | 0 | 1 | 0 | 0 |
| 1 | 0 | 0 | 0 | 1 |
| 1 | 1 | 1 | 1 | 1 |
| 1 | 1 | 0 | 0 | 0 |
| 1 | 1 | 1 | 1 | 1 |

292

| | 1 | 2 | 3 | 4 | 5 | 6 | 7 |
|---|---|---|---|---|---|---|---|
| | Initial Operation Selector Input (302) Subtraction = 0 Addition = 1 | First Operand Sign Selection Input (304) Negative (-) = 0 Positive (+) = 1 | Second Operand Sign Selection Input (306) Negative (-) = 0 Positive (+) = 1 | Function F | Function F Assignment | C Register Sign Bit Negative (-) = 0 Positive (+) = 1 | Final Operation Determined by the Control Unit Subtraction = SUB CC = 1 Addition = ADD CC = 1 |
| 1 | 0 | 0 | 0 | F8 | Subtract Negative (B Reg.) from Negative (A Reg.) | Positive if B Register is larger | Subtraction |
| 2 | 0 | 0 | 1 | F4 | Subtract Positive (B Reg.) from Negative (A Reg.) | Negative | Addition |
| 3 | 0 | 1 | 0 | F2 | Subtract Negative (B Reg.) from Positive (A Reg.) | Positive | Addition |
| 4 | 0 | 1 | 1 | F6 | Subtract Positive (B Reg.) from Positive (A Reg.) | Positive if A Register is larger | Subtraction |
| 5 | 1 | 0 | 0 | F3 | Add Negative (A Reg.) to Negative (B Reg.) | Negative | Addition |
| 6 | 1 | 0 | 1 | F7 | Add Negative (A Reg.) to Positive (B Reg.) | Positive if B Register is larger | Subtraction |
| 7 | 1 | 1 | 0 | F5 | Add Positive (A Reg.) to Negative (B Reg.) | Positive if A Register is larger | Subtraction |
| 8 | 1 | 1 | 1 | F1 | Add Positive (A Reg.) to Positive (B Reg.) | Positive | Addition |

CONTROL FUNCTION BIT TABLE

FIG. 3B

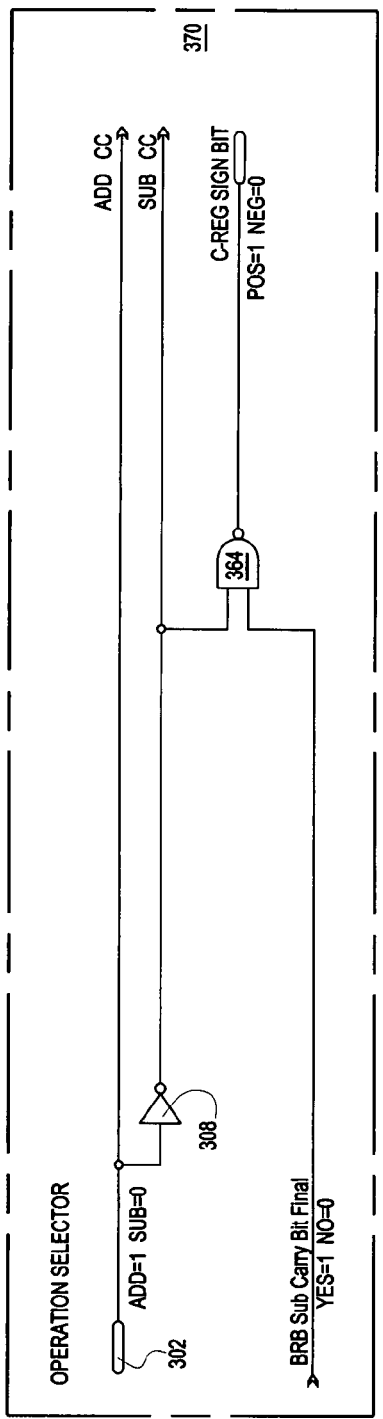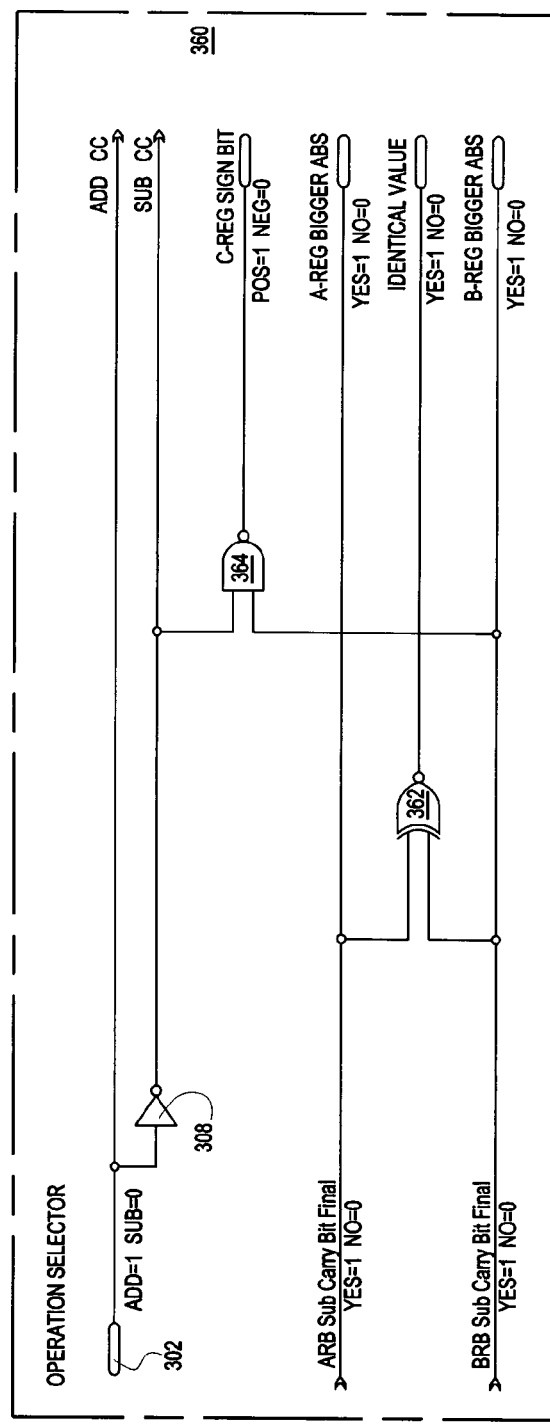

ONE STEP BINARY SUMMARIZER

BACKGROUND OF THE INVENTION (1) Field of the Invention

The present invention relates to the field of digital arithmetic circuits and, more particularly, a binary digital arithmetic summarizer (Adder-Subtractor-Comparator) using digital logic circuits.

(2) Description of Related Art

Many computer related books state that a computer can perform only the following three basic functions: addition, subtraction and comparison. Most of today's computers perform arithmetic operations using adders, mostly implemented by digital logic functions (or circuits). Reference is made to the following exemplary U.S. Patent documents that disclose various arithmetic computing devices: 2006/0064455; 2004/0021482; 2003/0158882; 2003/0028575; 2002/0188641; 6,781,412; 6,505,226; 5,905,662; 4,970,677; 4,942,548; 4,897,808; 4,766,565; 4,685,079; 4,559,608; 4,254,471; 3,843,876; 3,679,883; 3,646,332; 3,602,705; 3,465,133; 3,482,085. Also many educational WEB sites contain and publish educational literature: www.shef.ac.uk/physics/teaching/phy107/logicsub.html is related to a subtractor circuit, and www.ece.umd.edu/~ppetrov/ENEE244_FA06/Adders.ppt is related to a full adder circuit.

In addition to the fundamental arithmetical operation in digital electronics, all arithmetical computations (Adding and Subtracting) can be reduced to a simple addition operation. For example, subtraction can be treated as addition by the use of complementary numbers. FIG. 1A illustrates a well-known, conventional 1-bit full adder 100 that has been in use for many years, and FIG. 1B illustrates a corresponding truth table for the 1-bit full adder of FIG. 1A.

As illustrated in FIG. 1A, conventional 1-bit full adders are comprised of an XOR function logic gate 102 that receives input values from the A and B registers, which contain or hold two numbers or operands on which the addition operation of the full adder 100 will operate. The A and B registers are further coupled to an AND function logic gate 106. With the combination of the XOR function logic gate 102 and the AND function logic gate 106 forming the first half of the full adder. Further included with the full adder 100 of FIG. 1A are a second XOR function logic gate 104, a second AND function logic gate 108, and an OR function logic gate 110, which combine the "Carry" signals form the current bit and from the previous bit's operation, forming the full adder circuit 100.

The function of the first AND logic gate 106 is to create the "Carry" signal if both of the input operands has a high (=1) input value. The function of the second AND logic gate 108 is to create the "Carry" signal if only one of the input operands and the Carry from the previous adjacent lower Bit's operation has a high (=1) input value. The operation of the 1-bit full adder circuit 100 is best explained by the use of the truth table as illustrated in FIG. 1B. In the selected case (112), register A contains or holds the logic value of "1" and the register B contains the logic value of "1", and the carry-in register Ci holds the logic value "0". The output signals are the combined results of the logic functions gates 106, 108, 110 and 104 as illustrated in the selected case (112), as the Sum bit output holds a low value (=0) and the Carry bit output holds a high value (=1). Since this full Adder circuit is well-known and it has been in use for many years, no further explanation is required.

FIG. 1C illustrates an implementation of the well-known, 1-bit subtractor 120 that has been in use for many years, and FIG. 1D illustrates a corresponding truth table for the 1-bit full subtractor of FIG. 1C. As illustrated in FIG. 1C, this 1-bit full subtractor is similar to the 1-bit full adders, with the exception that the value of register A (the minuend operand) is inverted by the INV function logic gate 126 prior to its application to the AND function logic gate 122. In addition, the output of the first XOR function logic gate 102 is first inverted by the INV function logic gate 128 prior to input to the AND function logic gate 124. The inversion operation of the INV function logic gate 128 provides the actual complimentary values needed for performing subtraction. Therefore, this prior art device is based on and uses the concept of "borrowing" to execute the actual subtraction operations on two operands, using binary complement operations on the subtrahend. The selected case of the FIG. 1D truth table (132) illustrates the input operands, the Borrow in, the Borrow out and the Difference bits values.

It should be noted, this prior art subtractor circuit 120 requires seven (7) logic function gates to complete one functional unit.

As stated above, in prior art electronics and computer arithmetic the subtraction operation can be treated as addition by the use of complementary numbers. The procedure for subtraction with either 1's or 2's complement is well known, and described in numerous publications. Referring to FIG. 1E, the A register holds the value for an exemplary three bit binary operand "011" as the minuend in the subtraction operation and the B register holds the value for an operand "101" as the subtrahend. The subtraction of these two binary numbers should be done by taking the complement of the subtrahend (content of the B register) and adding it to the minuend (content of the A register). In FIG. 1E the subtrahend (B register) has a larger value than the minuend (A register). This well-known procedure is systematically illustrated in FIG. 1E, with no further explanation. FIG. 1F is the other example for binary subtraction. In FIG. 1F, the A-Register holds the value for an exemplary three-bit binary operand "101" as the minuend in the subtraction operation, and B register holds the value for an operand "011" as the subtrahend. In FIG. 1F the subtrahend (B register) has a smaller value than the minuend (A register). This is also a well-known procedure and is systematically illustrated in FIG. 1F, without further explanations. It should be noted that both exemplary subtractions include multiple additions.

In "real world" applications for execution of subtraction operations, most prior art circuits use 1's or 2's complements, and perform multiple addition iterations before obtaining the final result. The subtractor circuit (120) illustrated in FIG. 1C requires multiple secondary operations if the subtrahend operand has a higher value than the minuend operand. Further, subtraction operations performed by most prior art circuits require the use of temporary storage devices such as a flip-flop to keep track of the iterating results. In order to avoid the use of complementary operations when executing subtraction operations, some prior art circuits swap the contents of the operands of two registers. That is, the operand with a larger magnitude in a second register is swapped with the operand with a smaller magnitude in a first register. This assures that the "subtrahend" register always contains an operand with smaller magnitude than the operand within the "minuend" register, thereby avoiding the use of one extra addition operation. However, the swapping operation between the operands of two registers is time consuming, which further slows the subtraction operation.

Accordingly, in light of the current state of the art and the drawbacks to computing devices mentioned above, a need exists for a computing device as described in the followings.

SUMMARY OF THE INVENTION

This device would perform comparison, addition, and subtraction operations simultaneously, regardless of the operands signs and values, therefore it would have the same speed or performance for all three operations. This device would perform all three operations, without the need for using complement operations on the operands, iterative additions, temporary storage devices, pre evaluating the operands for the possibility of the need of swapping of them or using additional instruction sets for the subtraction operation. Further, this device would perform both addition and subtraction operations using the same concept of "carry" used in the addition operations, instead of the borrow concept to perform a subtraction operations. Further, this device would use the same logic gate functions for addition and subtraction operations, thereby simplifying circuit topographies. It would eliminate the need and/or the utilization of a separate comparator, adder and subtractor circuits. More importantly it would lower the overall time required for the subtraction and comparison operations to the level of the addition operation. Therefore, the time requirements for all three operations would be identical and constant.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Throughout the disclosure, the words "logic function gate" is used exclusively to mean a logical function combination of electronic components and not a specific integrated circuit.

Referring to the drawings in which like-referenced character(s) present corresponding parts throughout:

FIG. 1A is an exemplary prior art illustration for an adder circuit, and the prior art FIG. 1B is the truth table thereof;

FIG. 1G is an exemplary prior art illustration for subtraction using a borrowing methodology using decimal numbers;

FIG. 1H is an exemplary prior art illustration for subtraction using a borrowing methodology using binary numbers;

FIG. 2A is an exemplary illustration for subtraction of two decimal numbers using subtraction-by-addition methodology that uses the carry concept in accordance with the present invention;

FIG. 2B is an exemplary illustration for subtraction of two binary numbers where the minuend has a larger value than the subtrahend, using subtraction-by-addition methodology that uses the carry concept in accordance with the present invention;

FIG. 2C is an exemplary illustration for subtraction of two binary numbers where the minuend has a smaller value than the subtrahend, using subtraction-by-addition methodology that uses the carry concept in accordance with the present invention;

FIG. 2D is an exemplary illustration of addition tables used by the subtraction-by-addition methodology that use the carry concept in accordance with the present invention;

FIG. 2G is the truth table thereof;

FIG. 2H is the truth table thereof;

FIG. 3B is an exemplary illustration of a table that tabulates the various functions of the optional Operation Control Unit illustrated in FIG. 3A in accordance with the present invention;

FIG. 3C is an exemplary embodiment schematic illustration of the Operation Control Unit FIG. 3A when not all features are required in accordance with the present invention;

FIG. 3D is another exemplary embodiment schematic illustration of the Operation Control Unit FIG. 3A with only the necessary signal functions in accordance with the present invention;

DETAILED DESCRIPTION OF THE INVENTION

The detailed description set forth below in connection with the appended drawings is intended as a description of presently preferred embodiments of the invention and is not intended to represent as the only forms in which the present invention may be constructed and/or utilized.

For purposes of illustration, the various circuit topographies illustrated throughout the disclosure use logic gates, which are symbolic representations of logic functions. The disclosure should not be limited by any specific symbol, logic gate, or any other representation of a logic function, but by the actual logic function itself. Non-limiting examples of logic gates representing logic functions may include AND, NAND, OR, NOR, XOR, XNOR, INV (inverter), or a combination thereof, etc.

Conventional arithmetic logic circuits use 1's or 2's compliment operations on operands to perform a subtraction operation, which in fact, implements the borrow concept of subtraction in digital format. The present invention provides a ONE STEP BINARY SUMMARIZER circuit that uses digital logic operations to perform addition and subtraction without using 1's or 2's complement on the operands. The novel and most fundamental aspect of the present invention is that the ONE STEP BINARY SUMMARIZER no longer uses the borrow concept to perform the subtraction operation on two operands. Instead, the circuitry of the present invention uses the carry concept of addition to perform both subtraction and addition operations. Therefore, the ONE STEP BINARY SUMMARIZER circuit of the present invention eliminates the need for multiple additions, the use of complements, pre-sorting the operands, and the use of additional instruction steps or micro codes to perform subtraction operation. The present invention can be packaged onto a single integrated circuit as part of the Arithmetic Logic Unit (ALU) of a Central Processing Unit (CPU).

Figures 1C, 1D:
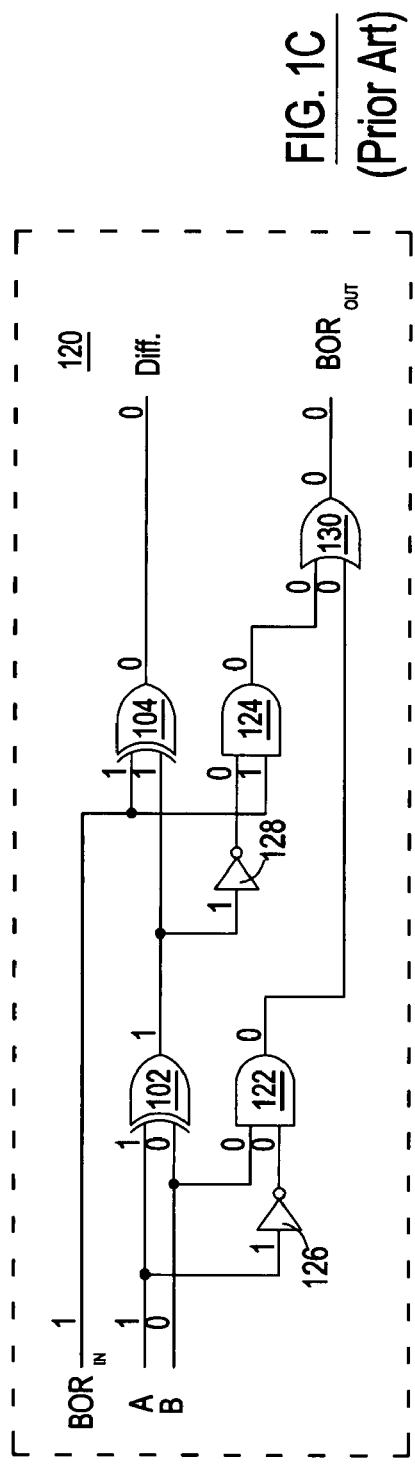
FIG. 1C is an exemplary prior art illustration for a subtraction circuit, and the prior art
FIG. 1D is the truth table thereof.
Figures 1E, 1F:
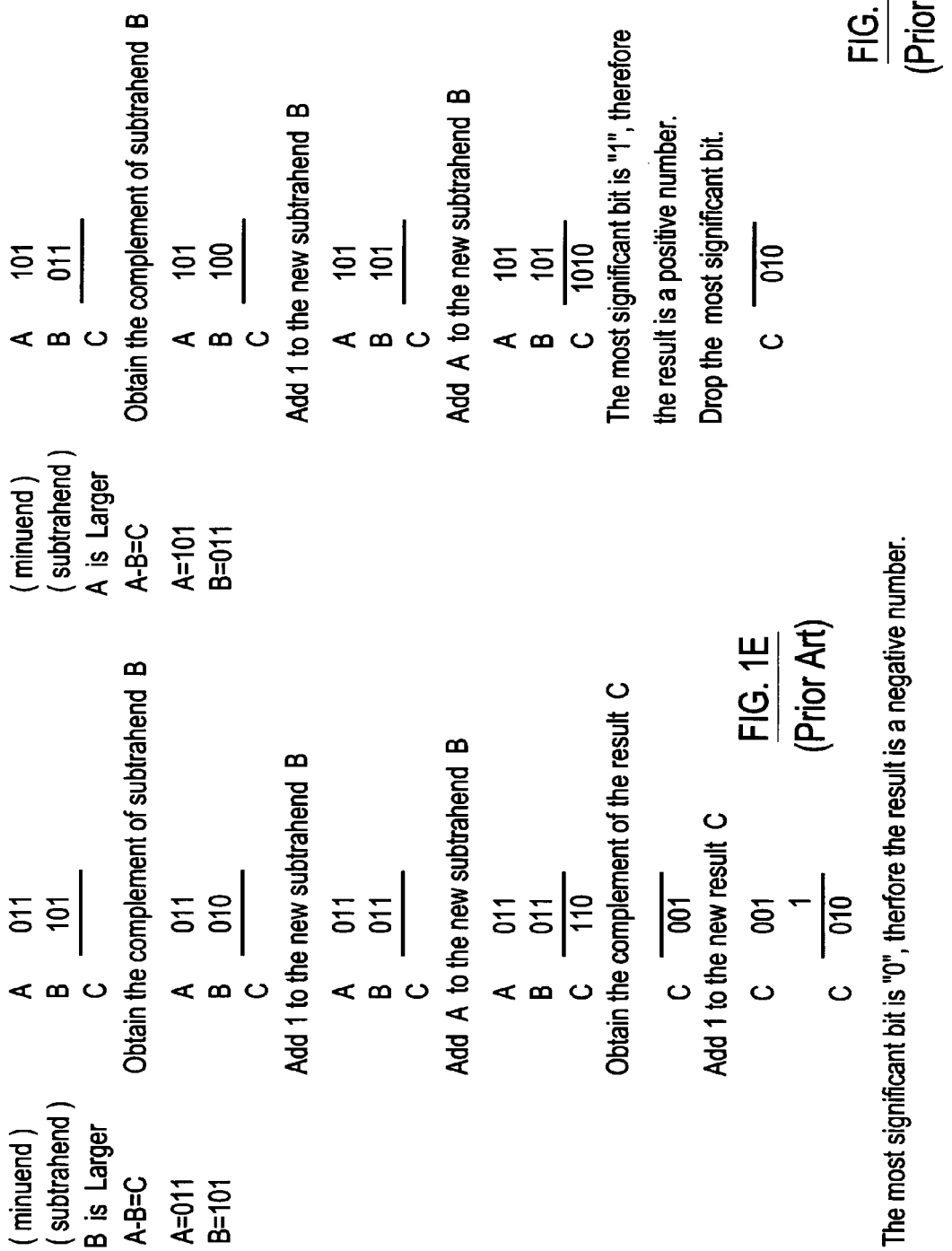
FIG. 1E is an exemplary prior art illustration for subtraction using a complement methodology where the minuend has a smaller value than the subtrahend.
FIG. 1F is an exemplary prior art illustration for subtraction using a complement methodology where the minuend has a larger value than the subtrahend.
Figure 2E:
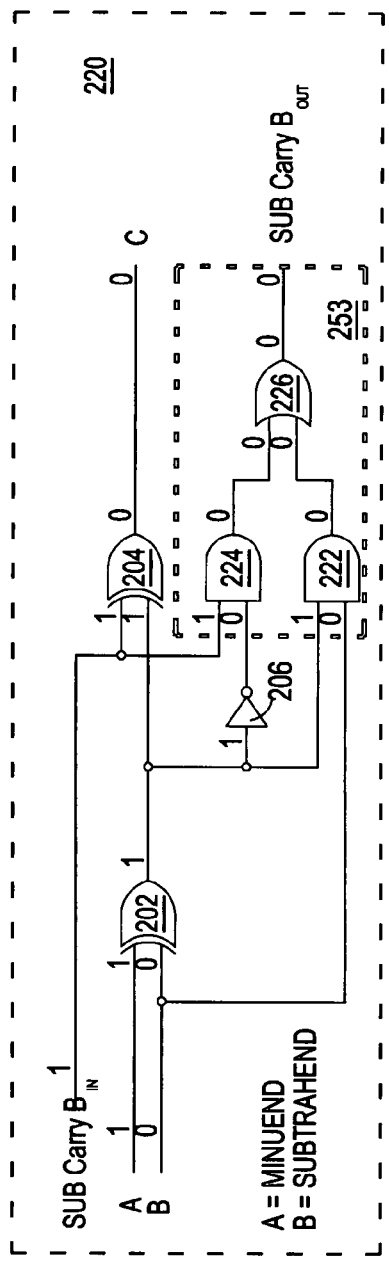
FIG. 2E is an exemplary schematic illustration of a binary subtractor circuit where the B register is the subtrahend, using subtraction-by-addition methodology, that use the carry concept, operations in accordance with the present invention.
Figure 2F:
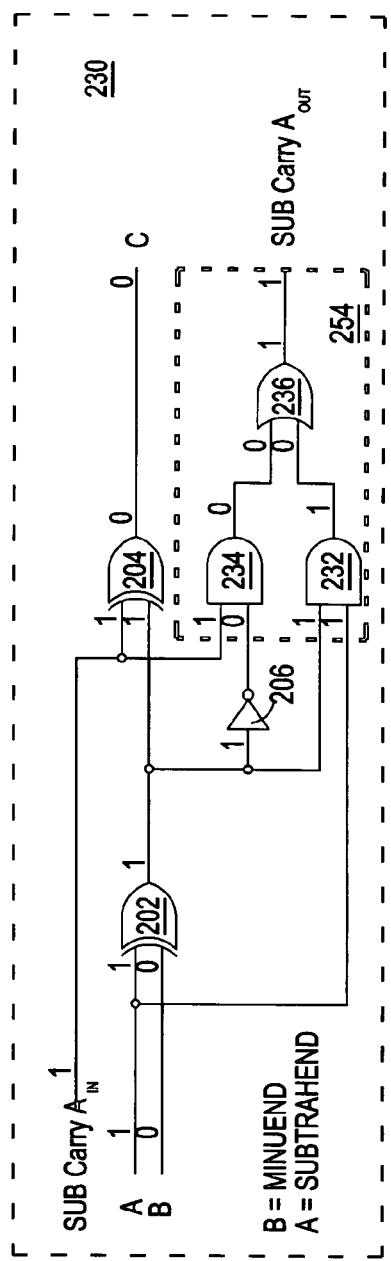
FIG. 2F is an exemplary schematic illustration of a binary subtractor circuit where the A register is the subtrahend, using subtraction-by-addition methodology, that use the carry concept, operations in accordance with the present invention.

The following is a brief explanation for the carry concept for subtraction in accordance with the present invention, which is subtraction-by-addition, and which will facilitate understanding for the operation of the ONE STEP BINARY SUMMARIZER circuit of the present invention. The borrow concept for subtraction has been taught as a basic, fundamental method for subtraction, a very simple example of which is illustrated in FIG. 1G and FIG. 1F, which requires no further explanation. The carry concept for subtraction—(subtraction-by-addition) that the ONE STEP BINARY SUMMARIZER circuit of the present invention implements—is illustrated in FIG. 2A for decimal numbers and for binary numbers in FIG. 2B and FIG. 2C and described below.

A first fundamental concept for the subtraction-by-addition methodology (carry concept) is to increase a digit of the minuend to the next higher level if that digit is smaller in value than that of its corresponding subtrahend digit. The amount of increase in the minuend depends on the base system of the numbers. For example, if the base of the operands were decimal, then the amount of increase would be ten (10), whereas for binary base number system, the amount would be two (2) (or binary "10"). It should be noted that in subtraction-by-addition methodology (carry concept), increasing the digit of the minuend by a base value is different from borrowing from a higher digit and then adding the base value to the preceding lower digit, which is illustrated in FIG. 1E and FIG. 1F. With the subtraction-by-addition methodology (carry concept), the higher digit's values of the minuend never changes. As illustrated in FIG. 2A (and further detailed below), no digit within the minuend operand is used for borrowing. In the subtraction-by-addition methodology (carry concept), only the two adjacent bits are manipulated. Conversely, in the subtraction-by-borrowing methodology, if the subtrahend has a high (=1) value and the minuend has a low (=0) value, and the next higher order adjacent bits of the minuend also have low (=0) values, then the borrowing is sequenced until the first high (=1) value bit within the minuend is found.

A second fundamental concept of the subtraction-by-addition methodology is the use of the carry concept rather than that of borrowing. If any particular digit of the minuend operand should increased by a base value of "1" that base value is immediately carried and added to the next higher adjacent digit of the subtrahend, therefore the real value of the minuend never changes. A major fundamental difference between the borrow methodology compared with that of the carry method is that the borrowed value can vary, whereas with the carry methodology, the carry value is always "1," regardless. In fact, it is "1" no matter which numeric base system is used. In other words, in the borrowing method the minuend's digit value changes and in the subtraction-by-addition method (carry concept) the minuend's digit value always stays constant.

A third fundamental concept for the subtraction-by-addition methodology (carry concept) is the use of an addition table (FIG. 2D), which is similar to a multiplication table. The addition table is used to determine the value of a digit—required to add to the subtrahend and the possible carry (which is always "1") that would equal the corresponding digit in the minuend. It should be noted, for decimal numbers all table elements could be used, however, for binary numbers only the zeros and ones (rows and columns) can be utilized.

FIG. 2D Table 293 illustrates all single digits that are usable for both the decimal and for the binary numbers. Table 294 is the extraction of table 293 and it usable only for the binary numbering system.

FIG. 2A illustrates a teaching example for subtraction-by-addition methodology (carry concept). As illustrated, the first digit of the subtrahend number is "8," which is larger than the first digit of the minuend, which is "3." In this case, the first digit "3" of the minuend operand is increased to the next higher level by the addition of the number's base value, which is "10," or 10+3=13. It should be noted that nothing was borrowed from the next adjacent higher digit minuend. The actual digit location value, which is "3", is not changed, and in fact, none of the minuend digits were affected. Next, the addition table (FIG. 2D Table 293) is used to determine the number required to be added to the subtrahend "8" that would add up to the new value in the minuend, which is "13," as illustrated in FIG. 2A. This would result the number "5," (or 13=5+8). Finally, a value of "1" is carried and added to the next adjacent digit of the subtrahend, which in this instance is the second digit of the subtrahend, the number "7."

As further illustrated in FIG. 2A, the second digit of the minuend operand is "2," which is smaller than the second digit of the subtrahend number, which is "7" plus the carry of "1" from the previous digit manipulations, for a total of "8" (7+1=8). In this case, the second digit "2" of the minuend operand is increased to the next higher level by the addition of the number's base value, which is "10," or 10+2=12. Again, this operation is performed independently, without altering other digits of the minuend. Next, the addition table (FIG. 2D 293) is used to determine the number required to be added to the new value of the subtrahend "8=(7+1)" that would add up to the new value in the minuend, which is "12," and as illustrated in FIG. 2A. This would result the number "4," (or 12=4+(7+1)). Finally, a value of "1" is carried and added to the next adjacent digit of the subtrahend, which in this instance is the third digit subtrahend, the number "6."

As also illustrated in FIG. 2A, the third digit of the minuend operand is "1," which is smaller than that of the third digit of the subtrahend number, which is "6" plus the carry of "1" from the previous digit manipulations, for a total of "7." In this case, the third digit "1" of the minuend operand is increased to the next higher level by addition of the number's base value, which is "10," or 10+1=11. Next, the addition table (FIG. 2D 293) is used to determine the number required to be added to the new value of the subtrahend "7=(6+1)" that would add up to the new value in the minuend, which is "11," and as illustrated in FIG. 2A. This would result the number "4," (or 11=4+(6+1)). Next, a value of "1" is carried and added to the next adjacent digit of the subtrahend, which in this instance is the number "4."

As finally illustrated in FIG. 2A, the forth digit of the minuend operand is "5," which is equal to that of the fourth digit of the subtrahend number, which is "4" plus the carry of "1" from the previous digit manipulations, for a total of "5." In this instance, the addition table (FIG. 2D 293) is used to determine the number required to be added to the new value of the subtrahend "5=(4+1)" that would add up to the value of the minuend, which is "5," and as illustrated in FIG. 2A. This would result the number "0," (or 5=0+(4+1)). As has been demonstrated, the subtraction-by-addition methodology has no borrowing, and in fact, no subtraction of two numbers. In addition, the borrowed value in using the borrowing method can vary, whereas with the carry method, the carry value is always "1." Therefore, each digit within the minuend is independently calculated, without altering or affecting the other digits.

FIG. 2B illustrates subtraction-by-addition method (carry concept) using a binary numbering system. As illustrated, the first digit of the subtrahend binary number is "1", which is larger than the first digit of the minuend, which is binary "0." In this case, the first binary digit "0" of the minuend operand is increased to the next higher level by the addition of the number's base value, which is a binary two or "10," for binary 10+0=10. It should be noted, that as stated earlier the value of the minuend location's digit does not change. Next, the addition table (FIG. 2D Table 294) is used to determine the number required to be added to the subtrahend binary "1" that would add up to the new value in the minuend, which is binary "10," and as illustrated in FIG. 2B. This would result the binary number "1," (or 10=1+1). Therefore, the result in register C for the first digit is a binary "1." Finally, a value of binary "1" is carried and added to the next adjacent digit of the subtrahend, which in this instance is the second digit subtrahend, the binary number "1."

As further illustrated in FIG. 2B, the second digit of the minuend operand is a binary "1," which is smaller than the second digit of the subtrahend number, which is a binary "1" plus the carry of binary "1" from the previous first digit manipulations, for a total of binary two "10." As a result, the minuend has a value of "1" and the new subtrahend has a value of binary "10." In this case, the second binary digit "1" of the minuend operand is increased to the next higher level by the addition of the number's base value, which is a binary two or "10," totaling 10+1=11. Therefore, the minuend now has the new value "11" and the subtrahend has the new value "10." Next, the addition table (FIG. 2D 294) is used to determine the number required to be added to the subtrahend binary "10" that would add up to the new value in the minuend, which is binary "11," and as illustrated in FIG. 2B. This would result the binary number "1", (or 11=10+1). Therefore, the result in register C for the second digit is a binary "1". Finally, a value of binary "1" is carried and added to the next adjacent digit of the subtrahend, which in this instance is the third digit subtrahend, the binary number "1".

As also illustrated in FIG. 2B, the third digit of the minuend operand is a binary "0," which is smaller than the third digit of the subtrahend, which is binary "1" plus the carry of binary "1" from the previous second digit manipulations, for a total of binary two "10." As a result, the minuend has a value of "0" and the new subtrahend has a value of binary "10." In this case, the third binary digit "0" of the minuend operand is increased to the next higher level by the addition of the number's base value, which is a binary two or "10," totaling 0+10=10. Therefore, the minuend now has the new value "10" and the subtrahend has the new value "10." For the third digits of both the minuend and the subtrahend, an addition table (FIG. 2D 294) is used to determine the number required to be added to the subtrahend binary "10=(1+1)" that would add up to binary "10" value of the minuend, and as illustrated in FIG. 2B. This would result the binary number "0". Therefore, the result in register C for the third digit is a binary "0". Finally, a value of binary "1" is carried and added to the next adjacent digit of the subtrahend, which in this instance is the fourth digit subtrahend, the binary number "0".

As finally illustrated in FIG. 2B, the forth digit of the minuend operand is a binary "1," which is equal to the fourth digit of the subtrahend number "0" plus the carry of binary "1" from the previous third digit manipulations, for a total of binary "1." As a result, the minuend has a value of "1" and the new subtrahend has a value of binary "1." Next, an addition table (FIG. 2D 294) is used to determine the number required to be added to the new value of the subtrahend binary "1=(0+1)" that would add up to the value of the minuend, which is binary "1". This would result the binary number "0," (or 1=0+(0+1)). Therefore, the result in the C-register for the fourth digit is a binary "0." It should be noted that because the minuend was not increased by a base value, a value of binary "1" is not carried, therefore not added to the next adjacent digit of the subtrahend, and hence, no overflow.

It should be noted, that in some instances, in order to obtain the correct result, a complementary operation should be carried out. However, although the subtraction-by-addition method may require the use of complementary operations if the subtrahend is larger than the minuend, the OSBS Unit (FIG. 2L 200) of the present invention provides a circuitry (Result Selector Sub-Module FIG. 2L 251) that implements the subtraction-by-addition method, without the use of any complementary operations. As has been demonstrated, the subtraction-by-addition has no borrowing, and in fact, no subtraction of two numbers.

FIG. 2C is similar to FIG. 2B, with the difference being this time the subtrahend has the higher value and the minuend has the lower value. Due to the higher value of subtrahend, the carry of the value of "1" will continue until the final digit. That is a secondary operation should be performed. The present invention does not utilize a secondary operation, but uses the final digit's (bit's) carry signal as a result selector, (Result Selector Sub-Module FIG. 2L 251) as it will be described later.

Based on the above explanations, the rules can be set for both addition and subtraction for the binary system carry generation as follows:
In Addition mode the high logic level (=1) carry will be generated if:
  1/both of the input operands have a high logic level (=1);
  2/only one of the input operands and the carry from the previous digit's operation has a high logic level (=1).
In Subtraction mode the high logic level (=1) carry will be generated if:
  1/the subtrahend operand has a high logic level (=1) and the minuend operand has a low logic level (=0);
  2/the input operands are identical, and the carry from the previous digit's operation has a high logic level (=1).

It should be noted, that the value of the carry in both the addition and the subtraction operation would be equal to low a logic level (=0) if no carry is present or a high logic level (=1) if the carry is present. If there are only two operands involved in the operation, then these rules or statements are true for both the Decimal and for the Binary operations. (The Decimal additions can have more than two addends.)

The ONE STEP BINARY SUMMARIZER circuit of the present invention uses the subtraction-by-addition (subtraction-by-carry) method described above, and implements the methodology using digital logic functions, represented by digital logic gates. The ONE STEP BINARY SUMMARIZER circuit of the present invention includes the following elements:

I. Operation Control Unit (FIG. 3A 300).
  A. Function Generator Module (FIG. 3A 301), which is a Sub-Module of the Operation Control Unit. It assigns the type of operation that is used on the operands.
  B. Sign Bit Generator Module (FIG. 3A 303), which is a Sub-Module of the Operation Control Unit. It generates the signs for the resultant operand.
  C. Magnitude and Sign Module (FIG. 3A 305), which is a Sub-Module of the Operation Control Unit. It generates the sign and magnitude display signals of the input operands (Comparator Display elements).
II. One Step Binary Summarizer Unit (FIG. 2L 200)
  A. Summarizer Module (FIG. 2L 240), that is used for summing the two input operands, both in addition and subtraction mode.
  B. Carry Control Module (FIG. 2L 250), which functions with the Summarizer Module to manipulate the carry operations for the addition and subtraction-by-addition operations. The Carry Control Module is one of the key elements of the present invention.
    1. Result Selector Sub-Module (FIG. 2L 251), which is a sub-module of the Carry Control Module, is an "intelligent" self-selector logic circuit, eliminating the need for any pre-sorting and any secondary operation. This allows the subtraction (by addition method) to operate with the same speed or performance as the addition, regardless of the input operands (A-Register and B-Register) values and signs.
    2. ADD Carry Generator Sub-Module (FIG. 2L 252), which is a sub-module of the Carry Control Module. This Module executes the rules to generate the carry bit for addition as described above.
    3. BRB SUB Carry Generator Sub-Module (FIG. 2L 253), which is a sub-module of the Carry Control Module. This Module executes the rules to generate the carry bit for subtraction if the B-Register operand has a higher value than the A-Register operand, as described above.
    4. ARB SUB Carry Generator Sub-Module (FIG. 2L 254), which is a sub-module of the Carry Control Module. This Module executes the rules to generate the carry bit for subtraction if the A-Register operand has a higher value than the B-Register operand, as described above.

In FIG. 2 L, the circuit diagram 200 is an exemplary schematic illustration of a complete one-bit One Step Binary Summarizer Unit (OSBS Unit) of the ONE STEP BINARY SUMMARIZER circuit in accordance with the present invention.

The Summarizer Module 240 receives input values from the input registers A-Register and B-Register (A-Reg Bit X and B-Reg Bit X), which contain or hold two numbers or operands on which the addition, subtraction, and comparison operations are to operate. The Summarizer Module 240 also receives the selected carry signal from the Result Selector Sub-Module 251 via the "carry the one" signal line 299. The result of the Summarizer Module 240 is the output register (C-Reg Bit X).

The ADD Carry Generator Sub-Module 252 receives information from the input operand registers (A-Reg Bit X and B-Reg Bit X), the compared signal of the input operand registers (A-Reg Bit X and B-Reg Bit X), and the carry signal from the previous adjacent lower bit (ADD Carry Bit X-1). The output is the ADD Carry Bit X signal, which is used by the next adjacent higher bit.

The BRB SUB Carry Generator Sub-Module 253 receives information from the input operand register (B-Reg Bit X), the compared signal of the input operand registers (A-Reg Bit X and B-Reg Bit X), the compared inverted signal of the input operand registers (A-Reg Bit X and B-Reg Bit X), and the carry signal from the previous adjacent lower bit (BRB Sub Carry X-1). The output is the BRB Sub Carry Bit X signal, which is used by the next adjacent higher bit.

The ARB SUB Carry Generator Sub-Module 254 receives information from the input operand register (A-Reg Bit X), the compared signal of the input operand registers (A-Reg Bit X and B-Reg Bit X), the compared inverted signal of the input operand registers (A-Reg Bit X and B-Reg Bit X), and the carry signal from the previous adjacent lower bit (ARB Sub Carry X-1). The output is the ARB Sub Carry Bit X signal, which is used by the next adjacent higher bit.

The Result Selector Sub-Module 251 receives the operation input information from the Operation Control Unit (ADD CC and SUB CC). The Result Selector Sub-Module 251 also receives the carry information from the previous adjacent lower bit (ADD Carry Bit X-1, ARB Sub Carry Bit X-1 and BRB Sub Carry Bit X-1) and the carry information ("overflow") from the final bit (ARB Sub Carry Bit Final and BRB Sub Carry Bit Final). The output of the Result Selector Sub-Module 251 is the "carry the one" signal line 299. The "carry the one" signal line 299 is connected to the Summarizer Module 240.

In the Final Bit, the three output signals of the Carry Control Module 250 change signal names. The ADD Carry Bit X will be named as Overflow, the ARB Sub Carry Bit X will be named as ARB Sub Carry Bit Final, and the BRB Sub Carry Bit X will be named as BRB Sub Carry Bit Final.

In the Summarizer Module 240, the input operand A-Register (A-Reg Bit X) is connected to one of the input pins of the first XOR function logic gate 202. The input operand B-Register (B-Reg Bit X) is connected to the second input pin of the first XOR function logic gate 202. The output of the first XOR function logic gate 202 is connected to one of the input pins of the second XOR function logic gate 204.

In the Carry Control Module 250 the input operand A-Register (A-Reg Bit X) is connected to one of the input pins of the AND function logic gate 212. The input operand B-Register (B-Reg Bit X) is connected to the second input pin of the AND function logic gate 212. The output of the AND function logic gate 212 is connected to one of the input pins of an OR function logic gate 216. The function of the AND function logic gate 212 is to generate the ADD Carry Bit X in addition mode if both of the input operands have a high (=1) logic value as described in Rule #1 in addition mode.

The output of the first XOR function logic gate 202 is also connected to one of the input pins of the AND login function gate 214. The ADD Carry (ADD Carry Bit X-1) output from the previous bit's operation (ADD Carry Bit X) is connected to the second input pin of the AND function logic gate 214. The output of the AND function logic gate 214 is connected to the second input pin of the OR function logic gate 216. The function of the AND function logic gate 214 is to generate the ADD Carry Bit X in addition mode if only one of the input operands has a high (=1) logic value and the carry from the previous adjacent bit's operation has a high (=1) logic value as described in Rule #2 in addition mode.

If either one of the addition carry generation rules is applicable, that is if either one of the AND function logic gates 212 or 214 has a high (=1) logic value output, then the result will be passed to the next adjacent higher bit by the output of the OR function logic gate 216 as ADD Carry Bit X.

In the Carry Control Module 250 the input operand B-Register (B-Reg Bit X) is also connected to one of the input pins of the AND function logic gate 222. The output of the first XOR function logic gate 202 is also connected to the second input pin of the AND function logic gate 222. The output of the AND function logic gate 222 is connected to one of the inputs of the OR function logic gate 226. The function of the AND function logic gate 222 is to generate the BRB SUB Carry Bit X in subtraction mode if the subtrahend operand B-Register (B-Reg Bit X) has a high (=1) logic value and the minuend operand A-Register (A-Reg Bit X) has a low (=0) logic value as described in Rule #1 in subtraction mode.

The output of the first XOR function logic gate 202 is also connected to the input of an INV function logic gate 206. The purpose of the INV function logic gate 206 is to check the input operands for equality. The output of the INV function logic gate 206 is connected to one of the input pins of an AND function logic gate 224. The carry bit (BRB Sub Carry Bit X-1) from the previous bit's operation (BRB Sub Carry Bit X) is connected to the second input pin of the AND function logic gate 224. The output of the AND function logic gate 224 is connected to the second input of the OR function logic gate 226. The function of the AND function logic gate 224 is to generate the BRB SUB Carry Bit X in subtraction mode if the two operands have identical logic values and the BRB Sub Carry Bit X-1 from the previous bit's operation (BRB Sub Carry Bit X) has a high (=1) logic value as described in Rule #2 in subtraction mode.

If either one of the subtraction carry generation rules is applicable, that is if either one of the AND function logic gates 222 or 224 has a high (=1) logic value output, then the result will be passed to next adjacent higher bit via the OR function logic gate 226 as BRB Sub Carry Bit X.

In the Carry Control Module 250 the input operand A-Register (A-Reg Bit X) is also connected to one of the input pins of the AND function logic gate 232. The output of the first XOR function logic gate 202 is also connected to the second input pin of the AND function logic gate 232. The output of the AND function logic gate 232 is connected to the one of the inputs of the OR function logic gate 236. The function of the AND function logic gate 232 is to generate the ARB SUB Carry Bit X in subtraction mode if the subtrahend operand A-Register (A-Reg Bit X) has a high (=1) logic value and the minuend operand B-Register (B-Reg Bit X) has a low (=0) logic value as described in Rule #1 in subtraction mode.

The output of the INV function logic gate 206 is also connected to one of the input pins of an AND function logic gate 234. The ARB Sub Carry Bit X-1 from the previous bit's operation (ARB Carry Bit X) is connected to the second input pin of the AND function logic gate 234. The output of the AND function logic gate 234 is connected to the second input of the OR function logic gate 236. The function of the AND function logic gate 234 is to generate the ARB SUB Carry Bit X in subtraction mode if the two operands have identical logic values and the ARB Sub Carry Bit X-1 from the previous bit's operation (ARB Carry Bit X) has a high (=1) logic value as described in Rule #2 in subtraction mode.

If either one of the subtraction carry generation rules are applicable, that is if either one of the AND function logic gates 232 or 234 has a high (=1) logic value output, then the result will be passed to the next adjacent higher bit via the OR function logic gate 236 as ARB Sub Carry Bit X.

In the Result Selector Sub-Module 251 the ADD CC (Addition Carry Control) signal from the Operation Control Unit is connected to one of the input pins of an AND function logic gate 218. The second input of the AND function logic gate 218 is connected to the ADD Carry Bit X-1 from the previous adjacent bit. The output of the AND function logic gate 218 is connected to one of the input pins of a three input OR function logic gate 208. The output of the OR function logic gate 208 is connected to the second XOR function logic gate's 204 second input pin via the "carry the one" signal line 299, therefore completing the full adder circuit. The function of the AND function logic gate 218 is to pass the previous addition carry bit to the second XOR function logic gate 204. The ADD CC logic signal controls this function. The source of the ADD CC signal (Addition Carry Control) and the SUB CC signal (Subtraction Carry Control) is the Operation Control output signal in the Operation Control Unit 300. Since they are complements of each other, the ONE STEP BINARY SUMMARIZER circuit can be only in addition mode or in subtraction mode at any given time. In addition mode the ADD CC signal is set to high logic level (=1), therefore the SUB CC must be set to low logic level (=0). The high logic level (=1) of the ADD CC signal will enable the ADD Carry Bit X-1 signal to be passed over to the second XOR function logic gate 204 via the OR function logic gate 208. Since in addition mode the SUB CC signal has a low logic level (=0) the ARB Sub Carry Bit X-1 and the BRB Sub Carry Bit X-1 signals are blocked.

In the Result Selector Sub-Module 251 the SUB CC signal (Subtraction Carry Control) is connected to one of the input pin of a three input AND function logic gate 228. As stated above, the source of the ADD CC signal (Addition Carry Control) and the SUB CC signal (Subtraction Carry Control) is the Operation Control input signal in the Operation Control Unit 300. Since the ONE STEP BINARY SUMMARIZER circuit can be only in addition mode or in subtraction mode at any given time, in subtraction mode the SUB CC is set to high logic level (=1), therefore the ADD CC must be set to low logic level (=0). The high logic level (=1) of the SUB CC signal will enable the sub carry bits (ARB Sub Carry Bit X-1 and the BRB Sub Carry Bit X-1 signal) from the previous bit's operation to be passed over to the second XOR function logic gate 204 via the OR function logic gate 208. Since in subtraction mode the ADD CC signal has a low logic level (=0) the ADD Carry Bit X-1 signal is blocked. The second input pin of the AND function logic gate 228 is connected to the BRB Sub Carry Bit X-1 signal, which is the Subtraction Carry signal from the previous adjacent bit operation where the operand B-Register is the Subtrahend and the A-Register is the Minuend. In order to select the ARB Sub Carry Bit X-1 or the BRB Sub Carry Bit X-1 signals, one more condition needs to be set, that is, which of the input operands has a higher absolute value versus the other input operand. The third input pin of the AND function logic gate 228 is connected to the ARB Sub Carry Bit Final signal. The function of this signal is to select the carry where the minuend operand has a higher value than the subtrahend operand. If all three signals (SUB CC, BRB Sub Carry Bit X-1, and ARB Sub Carry Bit Final) have a high logic level, then the output of the AND function logic gate 228 will be set to a high logic level (=1). If the AND function logic gate 228 has a high logic level (=1), then it will be passed over to the second XOR function logic gate 204 via the OR function logic gate 208 and the "carry the one" signal line 299, completing a subtractor circuit. This circuit utilizes the subtraction-by-addition method (carry concept), where no borrowing, no pre-sorting, and no secondary operation is being performed. In this configuration, the B-Register is the subtrahend and the A-register is minuend.

In the Result Selector Sub-Module 251 the SUB CC signal (Subtraction Carry Control) is also connected to one of the input pin of a three input AND function logic gate 238. The second input pin of the AND function logic gate 238 is connected to the ARB Sub Carry Bit X-1 signal, which is the Subtraction Carry signal from the previous adjacent bit operation where the operand A-Register is the Subtrahend and the B-Register is the Minuend. The third input pin of the AND function logic gate 238 is connected to the BRB Sub Carry Bit Final signal. The function of this signal is to select the carry where the minuend operand has a higher value than the subtrahend operand. If all three signals (SUB CC, ARB Sub Carry Bit X-1 and BRB Sub Carry Bit Final) have a high logic level, then the output of the AND function logic gate 238 will be set to a high logic level (=1). If the output of the AND function logic gate 238 has a high logic level (=1), then it will be passed over to the second XOR function logic gate 204 via the OR function logic gate 208 and the "carry the one" signal line 299, completing a subtractor circuit. This circuit is utilizes the subtraction-by-addition method (carry concept), where no borrowing, no pre-sorting, and no secondary operation is being performed. In this configuration, the A-Register is the subtrahend and the B-Register is the minuend.

Notes:
1/Logic function gates 202, 204, 208 and the "carry the one" signal line 299 are shared components between the addition and the subtraction operations, while logic gate 206 is a shared component only between the two mirrored subtraction carry circuits.
2/Logic function gates 212, 214, 216, and 218 are associated only with addition.
3/Logic function gates 222, 224, 226, and 228 are associated only with subtraction where the B-Register is the subtrahend and the A-Register is the minuend.
4/Logic function gates 232, 234, 236, and 238 are associated only with subtraction where the A-Register is the subtrahend and the B-Register is the minuend.

In subtraction the final bit's output should be set to a low logic level (=0), no carry or "overflow" should be present; however if the subtrahend operand has a higher value than the minuend operand, then the carry bit will be set to a high logic level (=1) as described above. The "intelligent self-selector" of the Result Selector Sub-module 251 utilizes this high level (=1) subtractor "overflow" carry signal. The Subtraction Carry Generator Sub-Modules 253 and 254 are mirror images of each other as exemplarily illustrated in FIG. 2E circuit 220 and FIG. 2F circuit 230. Circuit 230 subtracts the A-Register from the B-Register and circuit 220 subtracts the B-Register from the A-Register. The circuit, which has the "overflow" present (high logic level (=1)), is the one which would require the secondary operation. Therefore, the "overflow" signal serves as an indicator for the higher absolute value input operand. Instead of performing a secondary operation, this circuit's "overflow" indicator signal selects the other circuit as the result, as illustrated in FIG. 2L Result Selector Module 251 by the AND function logic gates 228 and 238. If the ARB Sub Carry Bit Final signal has a high (=1) logic value, that would indicate that the A-register has a higher value than the B-Register, therefore the B-Register should be the subtrahend operand. If the BRB Sub Carry Bit Final signal has a high (=1) logic value, that would indicate that the B-register has a higher value than the A-Register, therefore the A-Register should be the subtrahend operand. This self-selection eliminates the needs for a secondary operation, swapping the registers, and performing a pre-sorting operation. The other benefit of these "overflow" self-selector signals is that the subtractor function of the ONE STEP BINARY SUMMARIZER circuit can be used as a comparator circuit without any additional components.

As exemplarily illustrated in FIG. 2L circuit 250, the sub-modules 252, 253, and 254 are identical structures with identical logic function gates. That is, the structures are identical, the logic gates are identical, and the operations are identical, but the input pickup points and the output functions are different. Since the structures are identical, the logic gates are identical, and the operations are identical, then the operating speed must be identical as well. In other words, the subtraction and therefore the comparison as well, must run at the same speed as the addition. As exemplarily illustrated in FIG. 1A (Prior Art) circuit 100 the speed or the time requirements for the carry signal to "walk trough" on a multi bit adder circuit is two gate or propagation delays for each bit. The ONE STEP BINARY SUMMARIZER circuit also utilizes only two gate delays per bit for the process. However, the ONE STEP BINARY SUMMARIZER circuit can add, subtract, and compare with the same speed of two gate delays for each bit.

Figure 2J:
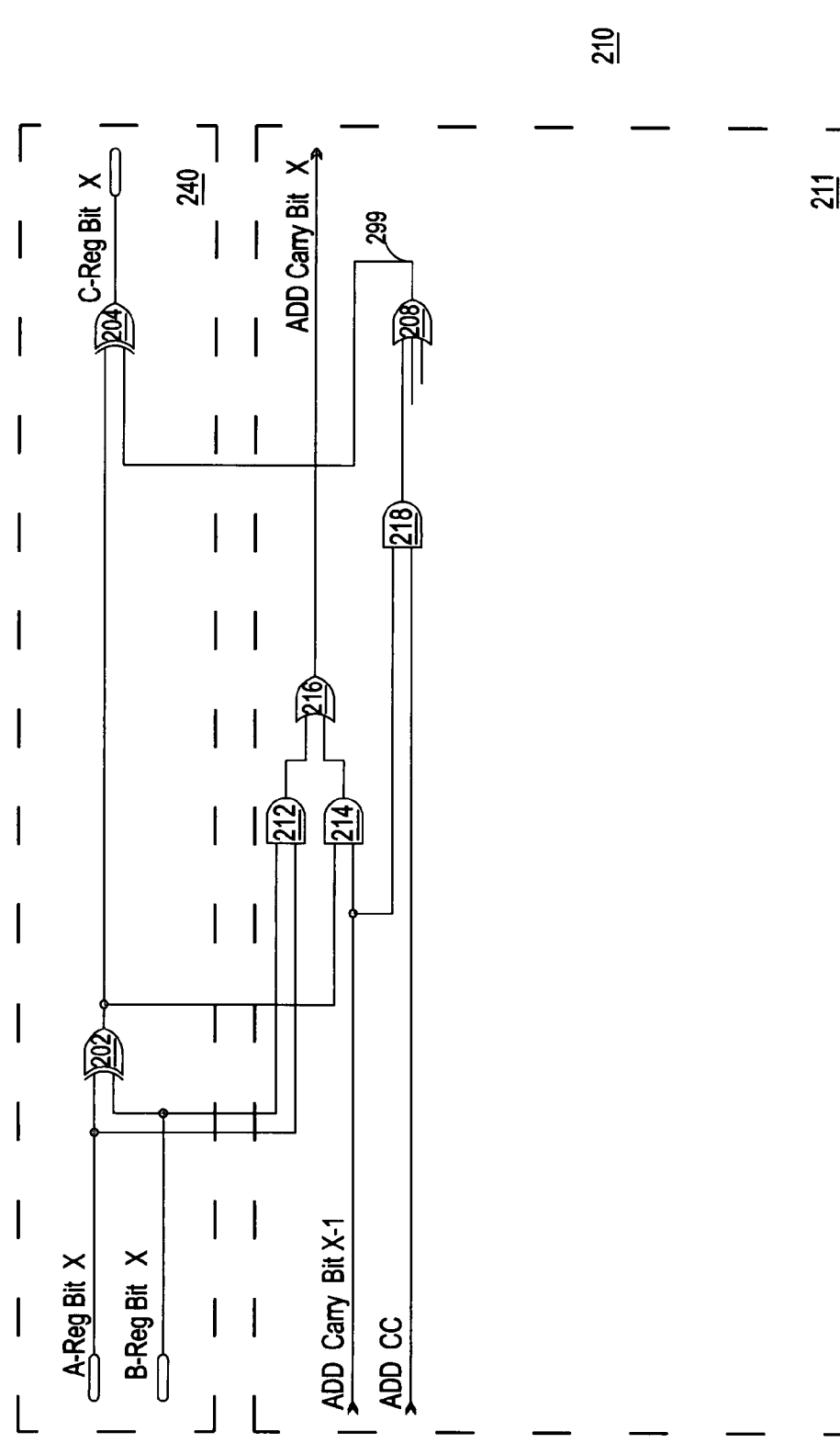
FIG. 2J is an exemplary schematic illustration of a Summarizer Module for addition mode used with the One Step Binary Summarizer (OSBS) Unit in accordance with the present invention.
Figure 2K:
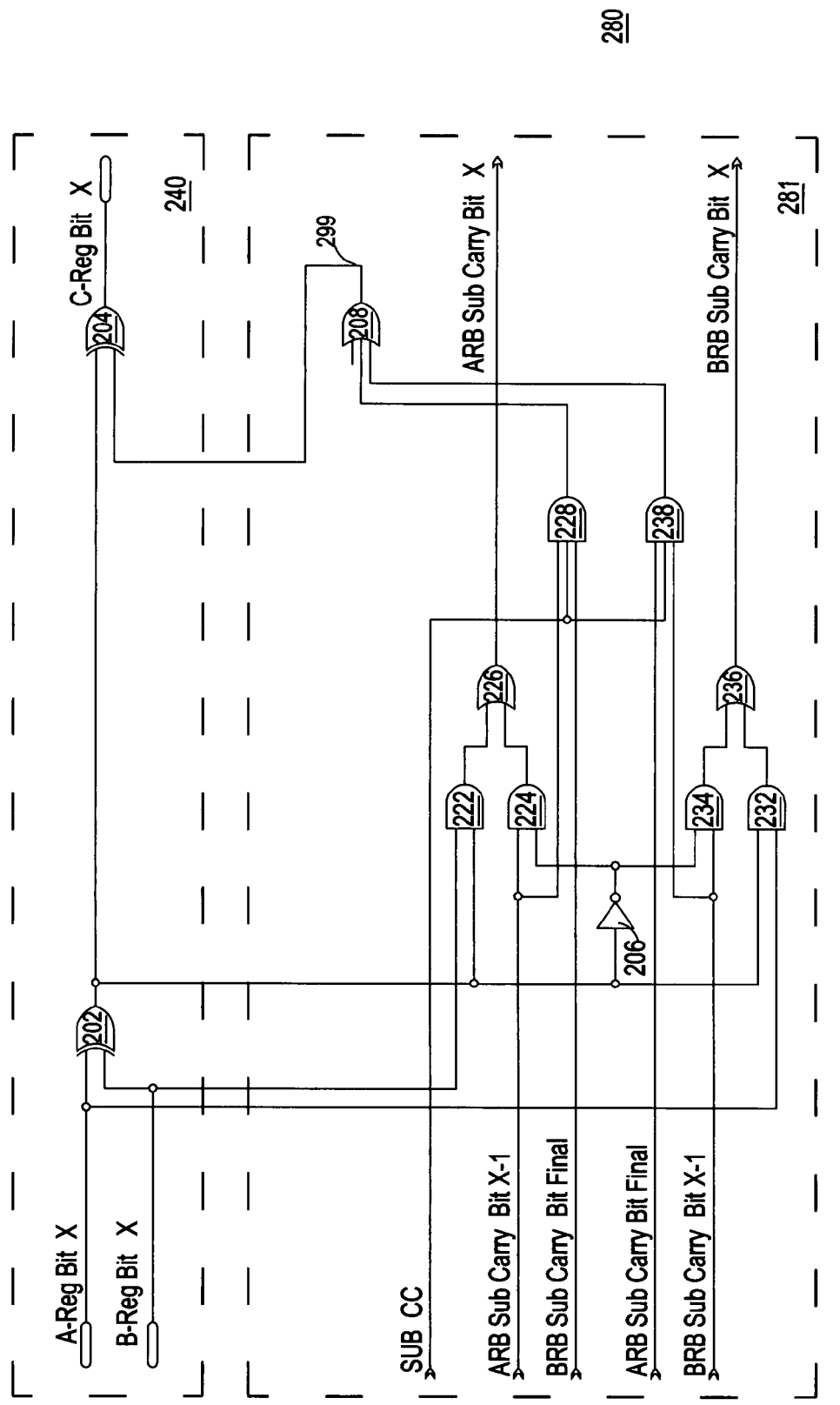
FIG. 2K is an exemplary schematic illustration of a Summarizer Module for subtraction mode used with the OSBS Unit in accordance with the present invention.
Figure 2L:
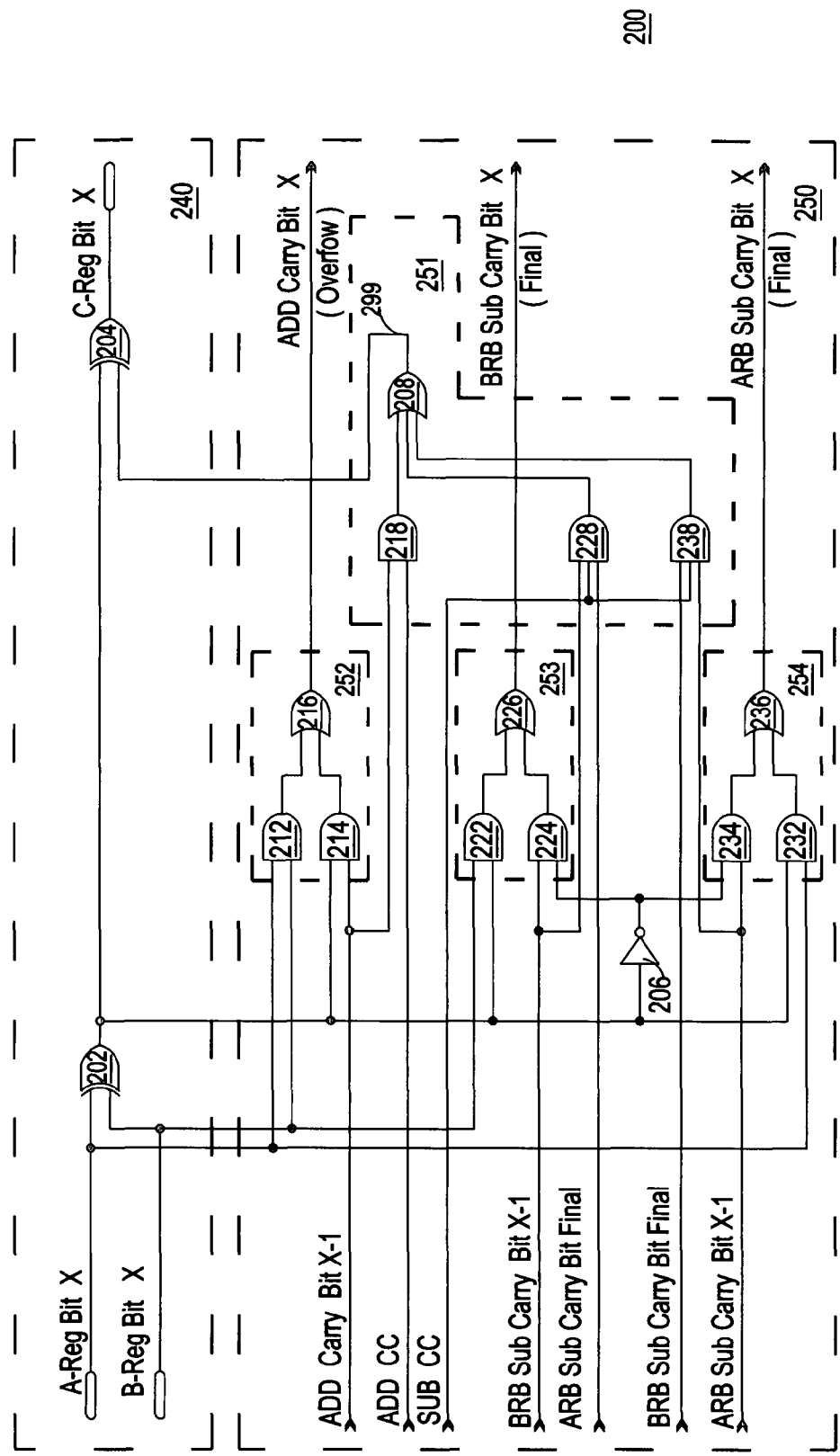
FIG. 2L is an exemplary schematic illustration of a complete one-bit OSBS Unit of the ONE STEP BINARY SUMMARIZER circuit in accordance with the present invention.
Figure 3A:
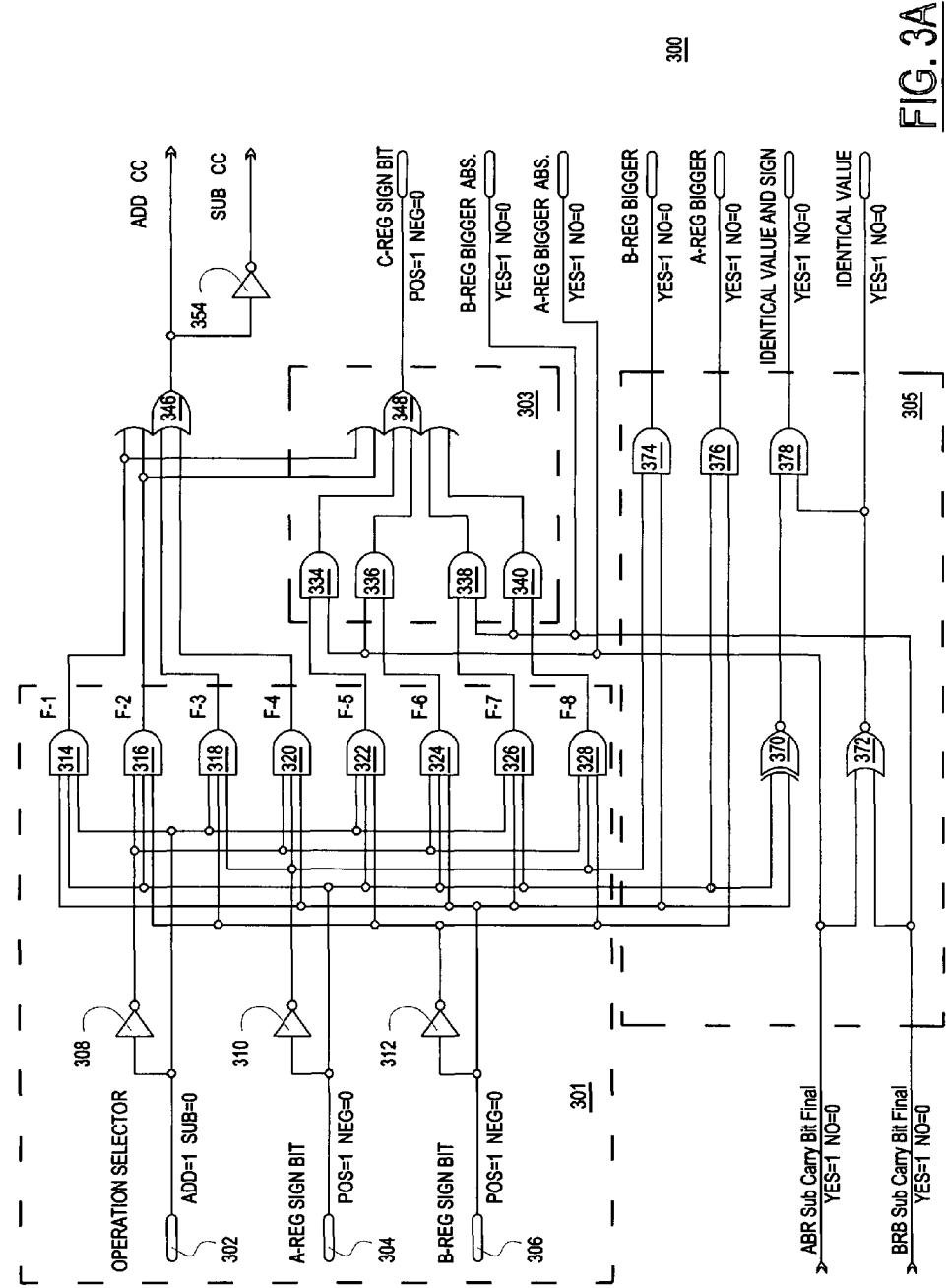
FIG. 3A is an exemplary schematic illustration of an optional Operation Control Unit in accordance with the present invention.

FIG. 2J circuit 210 is an embodiment of exemplary illustration of FIG. 2L, representing only the addition logic circuit section of the OSBS Unit 200, including the Summarizer Module 240 and the complete addition carry circuit 211. Since the input, output, internal connections, and the logic gate functions are not modified, no further explanation is required. The sole purpose of FIG. 2J is to supply the most comprehensible logic flow of the ONE STEP BINARY SUMMARIZER in addition mode.

FIG. 2K circuit 280 is another embodiment of exemplary illustration of FIG. 2L, representing only the subtraction logic circuit section of the OSBS Unit 200, including the Summarizer Module 240 and the complete subtraction carry circuit 281. Since the input, output, internal connections and the logic gate functions are not modified, no further explanation is required. The sole purpose of FIG. 2K is to supply the most comprehensible logic flow of the ONE STEP BINARY SUMMARIZER in subtraction mode.

Figure 2M:
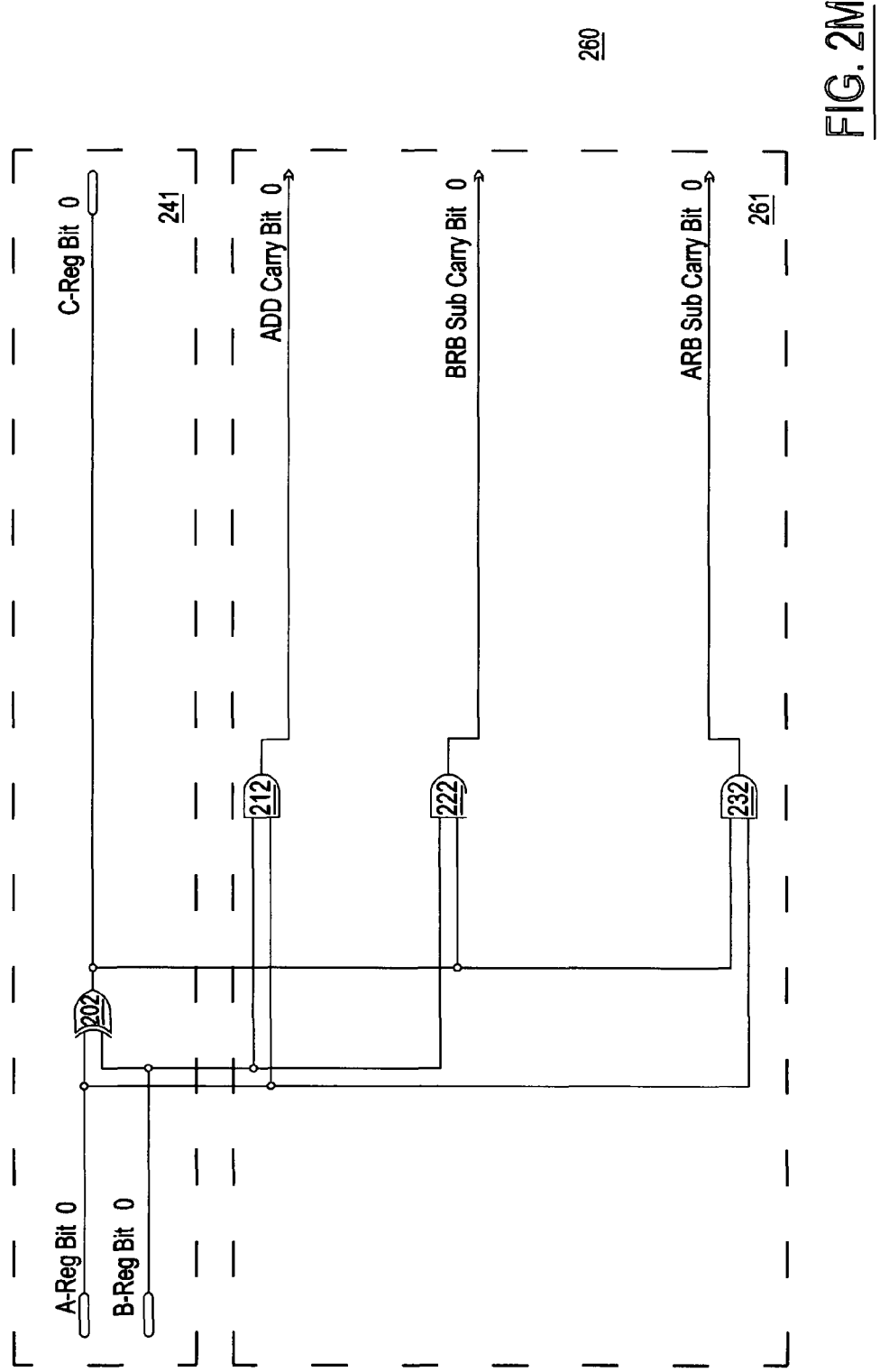
FIG. 2M is an exemplary embodiment schematic illustration of a one-bit OSBS Unit of the ONE STEP BINARY SUMMARIZER circuit used only for Bit 0 with reduced components in accordance with the present invention.

FIG. 2M circuit 260 is another embodiment of exemplary illustration of FIG. 2L, representing Bit 0 of the ONE STEP BINARY SUMMARIZER circuit. Bit 0 is the first bit in the structure. Since no previous bit can be present in front of Bit 0, Bit 0 cannot receive a Carry signal to modify the second XOR logic function gate (204). Therefore, the second XOR logic function gate (204) is useless for Bit 0, as illustrated in the modified version of the Summarizer Module 241. Since no carry signals are available for Bit 0, as illustrated in FIG. 2M, circuit 261, all unused logic gates can be eliminated, leaving only the active logic function gates in the circuit to perform their tasks, which are described in rule #1 for addition and rule #1 for subtraction. The input connections of the logic function gates 212, 222, and 232 are identical, without any modification as described for FIG. 2L. The output of the AND function logic gate 212 is the ADD Carry Bit 0 signal. The output of the AND function logic gate 222 is the BRB Carry Bit 0 signal. The output of the AND function logic gate 232 is the ARB SUB Carry Bit 0 signal. The advantage of this configuration is the saved components and smaller footprints or "real-estate" area.

Figure 2N:
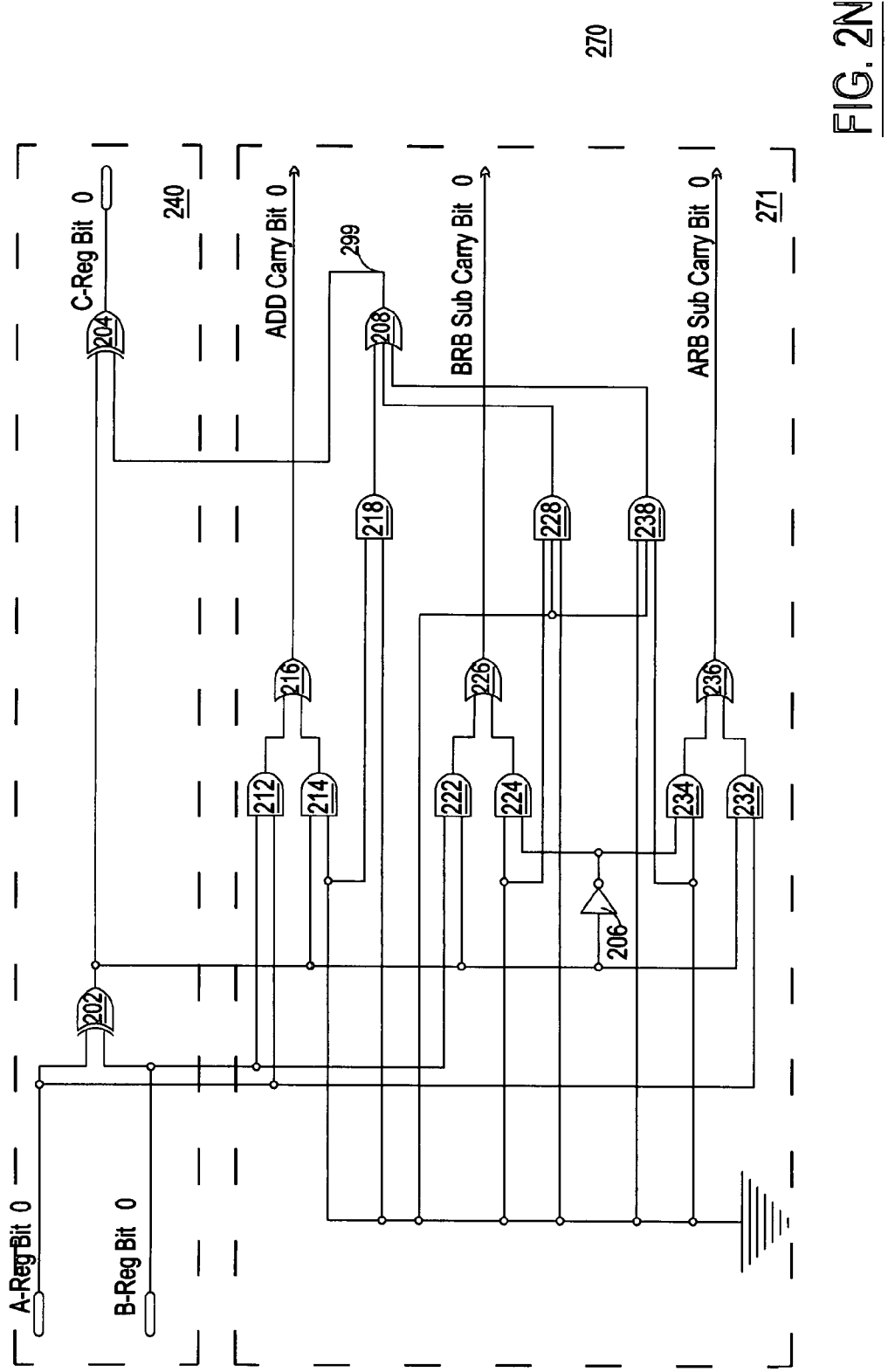
FIG. 2N is an other exemplary embodiment schematic illustration of a one-bit OSBS Unit of the ONE STEP BINARY SUMMARIZER circuit used only for Bit 0 with disabling the unused logic function gates, in accordance with the present invention.

On the other hand, FIG. 2N, circuit 270—where the functionality is identical to FIG. 2M circuit 260—is identical to FIG. 2L circuit 200. All logic function gates remain in their position and all internal connections are present, except the operation controls and the input carry signals, which are all unused, therefore all are disabled (grounded) as illustrated in circuit FIG. 2N circuit 271. The advantage of this configuration is that this version needs only one circuit as illustrated in FIG. 2L circuit 200, therefore reducing the inventory items. Neither configuration will affect the performance of ONE STEP BINARY SUMMARIZER circuit.

FIG. 3A is an exemplary illustration of the Operation Control Unit 300 used with the ONE STEP BINARY SUMMARIZER circuit of the present invention, and FIG. 3B illustrates the various functions of the Operation Control Unit in a Control Function Bit Table in accordance with the present invention.

Referring to FIGS. 3A and 3B, the Operation Control Unit 300, illustrated in FIG. 3A, functions to identify the type of operation (addition or subtraction) that is to be applied on the input operands (contents of A-Register and B-Register) and the signs (positive or negative) of the input operands. It also functions to determine the sign bit for the resultant operand (content of the C-Register), and output the compared absolute and real magnitude value of the input operands. It should be noted that functions determined by the Operation Control Unit 300, as illustrated in the Control Function Bit Table FIG. 3B, may be executed by using only an addition operation on operands while varying the signs of the operands. For instance, a positive number—representing the subtrahend—can be subtracted from a second positive number—representing the minuend—using addition, by changing the sign of the subtrahend into negative. On the other hand, the signs of the operands may be kept high (the sign bit of the operands equaling to "1"), which means that both input operands will have a positive sign, and instead, the operation selector may be used to perform the functions assigned. Therefore, any of the above-mentioned combinations of the operation versus the sign of the operands are valid. Accordingly, as illustrated in FIG. 3B, the operation selector input and the respective first and second operand sign selection inputs may be manipulated, the combinations of which result in different, mutually exclusive binary combination outputs that map to separate, distinct, and mutually exclusive functions F1 to F8.

As illustrated in FIGS. 3A and 3B, the Operation Control Unit of the present invention includes a well-known, commercially available Binary to Octal Decoder Module 301. It is illustrated in a detailed (gate-by-gate) format, which includes the three input lines 302, 304, and 306 (or N=3), and eight different, mutually exclusive binary combinations outputs ($2^N=2^3=8$) that map to eight separate, distinct, and mutually exclusive functions F1 to F8. Additional functionality would obviously require a larger number of input lines N, and a corresponding larger number of unique output lines $2^N$.

The functions F1 to F8 control the subtraction or addition operations. These operations are applied on the input operands, and further provide information with respect to the signs of the input operands and the result of the operation.

As illustrated in FIG. 3B, the various combinations of the initial operation selector input 302, the first operand sign selection input 304, and the second operand sign selection input 306 are used to determine the final logic operation (addition or subtraction) to be performed on the operands of A-Register and B-Register. Using the combination logic circuits (FIG. 3A), anyone of the mutually exclusive functions F1 to F4 can assign a high (=1) signal value to the ADD Carry Control (ADD CC) for final addition operation via the OR function logic gate 346. Functions F5 to F8 are mere complementary mirror images for the functions F1 to F4 in terms of the signs of the operands, and hence their output is not "wired" with the OR function logic gate 346. That is, F1 is a mirror image of F6, F2 is a mirror image of F7, F3 is a mirror image of F8, and F4 is a mirror image of F5. Therefore, if one of the functions F1, F2, F3, or F4 has a high (=1) signal value, that function will assign a high (=1) signal value to the ADD Carry Control (ADD CC) for addition operation via the OR function logic gate 346. However, if one of the functions F5, F6, F7, or F8 has a high (=1) signal value, that would mean that functions F1, F2, F3, and F4 have a low (=0) signal value. This logic combination would assign a high (=1) signal value to the SUB Carry Control (SUB CC) for subtraction operation via the OR function logic gate 346 and the INV function logic gate 354. The use of the same signal with the INV function logic gate 354 will ensure that the ONE STEP BINARY SUMMARIZER circuit will function as an adder circuit or as a subtractor circuit at any given time.

The value of the initial operation selector input signal 302 sets the initial operation (addition or subtraction), which is to be performed on the operands. However, the eight function bits (F1 to F8) settings determine the final logical operation that is to be executed on the operands. The signal value input of the first operand sign selection input 304 sets the sign for the content of the A-Register as indicated by column two of the Control Function Bit Table of FIG. 3B. If the signal value at the first operand sign selection input 304 is a low (=0), then the operand of the A-Register is a negative number, otherwise, if the first operand sign selection input 304 is a high (=1), then the operand of A-Register is a positive number. The signal value input of the second operand sign selection input 306 sets the sign for the content of the B-Register as indicated by column three of the Control Function Bit Table of FIG. 3B. If the signal value at the second operand sign selection input 306 is low (=0), then the operand of the B-Register is a negative number, otherwise, if the second operand sign selection input 306 is high (=1), then the operand of B-Register is a positive number.

The function F1 represents the addition operation between a first positive operand in A-Register and a second positive operand in B-Register. In particular, the initial operator selection input 302 is set to a high (=1) signal value, indicating an addition operation. The first operand sign selection input 304 is set to a high (=1) signal value, indicating a positive value for the first operand, and the second operand sign selection input 306 is set to a high (=1) signal value, indicating a positive value for the second operand. Accordingly, for function F1 (binary input value of "1 1 1," with 302="1," 304="1," and 306="1"), the function assignment is the addition operation of a first positive operand (A-Register) to a second positive operand (B-Register), resulting in a positive operand C-Register. It should be noted that with F1 set to a high (=1) signal value, the ADD Carry Control (ADD CC) is set to a high (=1) value via the OR function logic gate 346, as described earlier. The SUBtraction Carry Control (SUB CC) is set to a low (=0) value via the OR function logic gate 346 and the INV function logic gate 354. That is, for function F1 the final operation (addition or subtraction) applied to the first and second operands (determined by the combination logic of the Operation Control Unit 300) is the addition operation, as also indicated in column 7 of the Control Function Bit Table of FIG. 3B.

The function F2 represents the subtraction operation between a first positive operand in A-Register and a second negative operand in B-Register. In particular, the initial operation selector input 302 is set to a low (=0) signal value, indicating a subtraction operation. The first operand sign selection input 304 is set to a high (=1) signal value, indicating a positive value for the first operand, and the second operand sign selection input 306 is set to a low (=0) signal value, indicating a negative value for the second operand. Accordingly, for function F2 (binary input value of "0 1 0," with 302="0," 304="1," and 306="0"), the function assignment is the subtraction operation of a second negative operand (in register B) from a first positive operand (in register A), resulting in a positive operand in register C. It should be noted that with F2 set to a high (=1) signal value the ADD CC is set to a high (=1) value via the OR function logic gate 346 and the SUB CC is set to a low (=0) value via the INV function logic gate 354. That is, for function F2 the final operation (addition or subtraction) applied to the first and second operands (determined by the combination logic of the Operation Control Unit) is actually addition.

The function F3 represents the addition operation between a first negative operand in A-Register and a second negative operand in B-Register. In particular, the initial operation selector input 302 is set to a high (=1) signal value, indicating an addition operation. The first operand sign selection input 304 is set to a low (=0) signal value, which indicates a negative value for the first operand, and the second operand sign selection input 306 is set to a low (=0) signal value, which indicates a negative value for the second operand. Accordingly, for function F3 (binary input value of "1 0 0," with 302="1," 304="0," and 306="0"), the function assignment is the addition operation of a negative operand (in A-Register) to a negative operand (in B-Register), resulting in a negative operand in C-Register. It should be noted that with F3 set to a high (=1) signal value the ADD CC is set to a high (=1) value via the OR function logic gate 346 and the SUB CC is set to a low (=0) value via the INV function logic gate 354. That is, for function F3 the final operation (addition or subtraction) applied to the operands (determined by the combination logic of the Operation Control Unit) is addition.

The function F4 represents the subtraction operation between a first negative operand in A-Register and a second positive operand in B-Register. In particular, the initial operator selection input 302 is set to a low (=0) signal value, indicating a subtraction operation. The first operand sign selection input 304 is set to a low (=0) signal value, which indicates a negative value for the first operand, and the second operand sign selection input 306 is set to a high (=1) signal value, which indicates a positive value for the second operand. Accordingly, for function F4 (binary input value of "0 0 1," with 302="0," 304="0," and 306="1"), the function assignment is the subtraction operation of a positive operand (in B-Register) from a negative operand (in A-Register), resulting in a negative operand in register C. It should be noted that with F4 set to a high (=1) signal value the ADD CC is set to a high (=1) value via the OR function logic gate 346 and the SUB CC is set to a low (=0) value via the INV function logic gate 354. That is, for function F4 the final operation (addition or subtraction) applied to the operands (determined by the combination logic of the Operation Control Unit) is actually addition.

The function F5 represents the addition operation between a first positive operand in A-Register and a second negative operand in B-Register. In particular, the initial operation selector input 302 is set to a high (=1) signal value, indicating an addition operation. The first operand sign selection input 304 is set to a high (=1) signal value, which indicates a positive value for the first operand, and the second operand sign selection input 306 is set to a low (=0) signal value, which indicates a negative value for the second operand. Accordingly, for function F5 (binary input value of "1 1 0," with 302="1," 304="1," and 306="0"), the function assignment is the addition operation of a positive operand in A-Register to a negative operand in B-Register, resulting in a positive operand in C-Register if the operand in A-Register is larger than the operand in B-Register. It should be noted that with F5 set to a high (=1) signal value the ADD CC is set to a low (=0) value via the OR function logic gate 346 and the SUB CC is set to a high (=1) value via the INV function logic gate 354. That is, for function F5 the final operation (addition or subtraction) applied to the operands (determined by the combination logic of the Operation Control Unit) is actually subtraction.

The function F6 represents the subtraction operation between a first positive operand in A-Register and a second positive operand in B-Register. In particular, the initial operation selector input 302 is set to a low (=0) signal value, indicating a subtraction operation. The first operand sign selection input 304 is set to a high (=1) signal value, which indicates a positive value for the first operand, and the second operand sign selection input 306 is set to a high (=1) signal value, which indicates a positive value for the second operand. Accordingly, for function F6 (binary input value of "0 1 1," with 302="0," 304="1," and 306="1"), the function assignment is the subtraction operation of a positive operand in B-Register from a positive operand in A-Register, resulting in a positive operand in C-Register if the operand in A-Register is larger than the operand in B-Register. It should be noted that with F6 set to a high (=1) signal value the ADD CC is set to a low (=0) value via the OR function logic gate 346 and the SUB CC is set to a high (=1) value via the INV function logic gate 354. That is, for function F6 the final operation (addition or subtraction) applied to the operands (determined by the combination logic of the Operation Control Unit) is subtraction.

The function F7 represents the addition operation between a first negative operand in A-Register and a second positive operand in B-Register. In particular, the initial operation selector input 302 is set to a high (=1) signal value, indicating an addition operation. The first operand sign selection input 304 is set to a low (=0) signal value, which indicates a negative value for the first operand, and the second operand sign selection input 306 is set to a high (=1) signal value, which indicates a positive value for the second operand. Accordingly, for function F7 (binary input value of "1 0 1," with 302="1," 304="0," and 306="1"), the function assignment is the addition operation of a negative operand in A-Register to a positive operand in B-Register, resulting in a positive operand in C-Register if the operand in B-Register is larger than the operand in A-Register. It should be noted that with F7 set to a high (=1) signal value the ADD CC is set to a low (=0) value via the OR function logic gate 346 and the SUB CC is set to a high (=1) value via the INV function logic gate 354. That is, for function F7 the final operation (addition or subtraction) applied to the operands (determined by the combination logic of the Operation Control Unit) is actually subtraction.

The function F8 represents the subtraction operation between a first negative operand in A-Register and a second negative operand in B-Register. In particular, the initial operation selector input 302 is set to a low (=0) signal value, indicating a subtraction operation. The first operand sign selection input 304 is set to a low (=0) signal value, which indicates a negative value for the first operand, and the second operand sign selection input 306 is set to a low (=0) signal value, which indicates a negative value for the second operand. Accordingly, for function F8 (binary input value of "0 0 0," with 302="0," 304="0," and 306="0"), the function assignment is the subtraction operation of a negative operand in B-Register from a negative operand in A-Register, resulting in a positive operand in C-Register if the operand in B-Register is larger than the operand in A-Register. It should be noted that with F8 set to a high (=1) signal value the ADD CC is set to a low (=0) value via the OR function logic gate 346 and the SUB CC is set to a high (=1) value via the INV function logic gate 354. That is, for function F8 the final operation (addition or subtraction) applied to the operands (determined by the combination logic of the Operation Control Unit) is subtraction.

The Operation Control Unit 300 of the present invention is further comprised of a resultant operand Sign Bit Generator Module 303, which provides information with respect to the resultant operand (content of C-Register) sign bit. The detailed information listed in column 6 of the Control Function Bit Table of FIG. 3B. As illustrated, the sign of the resultant operand depends on the operation (addition or subtraction) being performed on the input operands (A-Register and B-Register), the absolute magnitude of the input operands, and the signs of the input operands.

The resultant operand Sign Bit Generator Module 303 uses the results of functions F1, F2, and F5 to F8, and the absolute magnitude of the operands in A-Register and B-Register from a the final bit's subtraction carry signals (ARB Sub Carry Bit Final and BRB Sub Carry Bit Final) to determine the sign of the resultant operand in the C-Register.

It should be note that if either F1 or F2 are enabled (active with a high signal equaling to "1"), then the resultant operand in the C-Register will always have a positive sign, which means that C-REG SIGN BIT will be set to a high value (=1). In addition, if any one of the functions F5 to F8 are enabled, then the C-Register sign bit C-REG SIGN BIT will be determined by the results from either the ARB Sub Carry Bit Final or the BRB Sub Carry Bit Final "overflow" signals from the final bit's Carry Control Module 250, in FIG. 2L. Further, if either F3 or F4 are enabled (active with a high signal equaling to "1"), then the resultant operand in the C-Register will always have a negative sign, which means that the C-REG SIGN BIT will be set to a low value (=0). Therefore, the results from functions F3 and F4 are not used ("wired") in the resultant operand Sign Bit Generator Module 303 for determining the sign bit of the operand in C-Register because the C-REG SIGN BIT will be a low value (=0), regardless.

As indicated above, the resultant operand Sign Bit Generator Module 303 is further coupled with two output signals from a the final bit ARB Sub Carry Bit Final and BRB Sub Carry Bit Final, which provide the result of the comparison between the absolute magnitudes of the operand in A-Register compared with the operand in B-Register. That is, if the operand A-Register has a larger value compared to the operand in B-Register, it would allow signals for functions F5 and F6 to pass through the respective AND function logic gates 334 and 336. If either signal function F5 or F6 is high (=1), then the C-REG SIGN BIT is set to a high (=1) logic level (=POSITIVE), otherwise to a low (=0) logic level (=NEGATIVE). On the other hand, if the operand in A-Register has a smaller value compared to the operand in B-Register, it would allow signals for functions F7 and F8 to pass through the respective AND function logic gates 338 and 340. If either signal function F7 or F8 is high (=1), then the C-REG SIGN BIT is set to a high (=1) logic level (=POSITIVE), otherwise to a low (=0) logic level (=NEGATIVE). As stated earlier, only one of the functions (F1 to F8) can be active at any given time, depending on the combination of the inputs 302, 304, and 306. Regardless, the outputs of the AND function logic gates 314, 316, 334, 336, 338, and 340 are the input signals of the OR function logic gate 348, and the output of the OR function logic gate 348 is the C-REG SIGN BIT, which is POSITIVE if the output is high (=1) logic level, and NEGATIVE if the output is low (=0) logic level.

The Operation Control Unit 300 of the present invention is further comprised of an optional equality of Magnitude and Sign Module 305, which determines if the operands of A-Register and B-Register are identical in absolute value, and if they are identical in both value and sign. For example, two numbers may be identical in their absolute values, but be different in sign (e.g., 4 and −4). As illustrated, the equality of Magnitude and Sign Module 305 includes a logic circuit that generates the output signals of IDENTICAL VALUE and IDENTICAL VALUE AND SIGN. If the IDENTICAL VALUE output line has a high (=1) signal value, then the two operands are identical in magnitude but different in signs, and if IDENTICAL VALUE AND SIGN output line has a high (=1) signal value, then the two operands are identical in both magnitude and sign. The equality of Magnitude and Sign Module 305 is comprised of six input signals. The ARB Sub Carry Bit Final and BRB Sub Carry Bit Final from the final bit's Carry Control Module 250 provide information related to the absolute value of the input registers (A-Register and B-Register). The other four signals are the sign signals and the inverted sign signals of the operands in A-Register and B-Register.

The ARB Sub Carry Bit Final signal is connected to one of the inputs of a NOR function logic gate 372 and the BRB Sub Carry Bit Final signal is connected to the other input of the NOR function logic gate 372. The output of the NOR function logic gate 372 is the IDENTICAL VALUE output signal, which has a high (=1) value, if the absolute magnitude of the two input registers (A-Register and B-Register) are identical., and has low (=0) value if the absolute magnitude of the two input registers (A-Register and B-Register) are different. The two sing bit signal lines (304 and 306) are connected to an XNOR function logic gate 370. The output of the XNOR function logic gate 370 is connected to one of the input lines of the AND function logic gate 378. The other input line of the AND function logic gate 378 is coupled with the output of the NOR function logic gate 372. The output of the AND function logic gate 378 is the IDENTICAL VALUE AND SIGN output signal. The IDENTICAL VALUE AND SIGN output signal has a high (=1) logic value if the two input registers (A-Register and B-Register) have identical absolute magnitudes and identical signs, and has a low (=0) logic value if the two input registers (A-Register and B-Register) have different absolute magnitudes or different signs.

The other two input signals used with the Magnitude and Sign Module 305 are the inverted signs of the two input register's sign bits. The input sing bit signal line of the A-REG SIGN BIT (304) is connected to the AND function logic gate 376. The inverted sing bit signal line of the B-REG SIGN BIT (306), which is the output of the INV logic function gate 312 is connected to the second input of the AND function logic gate 376. The output of the AND function logic gate 376 is the A-REG BIGGER signal. The A-REG BIGGER signal has a high (=1) logic value, if the A-Register's sign bit is set to positive (high="1") and the B-Register's sign bit is set negative (low="0"), indicating that the two input registers may have identical magnitudes, but the A-register has the higher relative value (e.g., 16 and −16). The input sing bit signal line of the B-REG SIGN BIT (306) is connected to the AND function logic gate 374. The inverted sing bit signal line of the A-REG SIGN BIT (304), which is the output of the INV logic function gate 310, is connected to the second input of the AND function logic gate 374. The output of the AND function logic gate 374 is the B-REG BIGGER signal. The B-REG BIGGER signal has a high (=1) logic value, if the B-Register's sign bit is set positive (high=1) and the A-Register's sign bit is set negative (low=0), indicating that the two input registers may have identical magnitudes, but the B-register has the higher relative value (e.g., −7 and 7).

Since the SUB Carry can generate the "overflow" only if the subtrahend operand has a higher value than the minuend operand, then this "overflow" signal is useable as a comparison result indicator. The signal line ARB Sub Carry Bit Final is connected to an output pin as a comparator result indicator, with the signal name as A-REG BIGGER ABS, which has a high (=1) signal value, only if the operand in the A-Register has a higher magnitude than the operand in the B-Register. The signal line BRB Sub Carry Bit Final is connected to an output pin as a comparator result indicator, with the signal name as B-REG BIGGER ABS, which has a high (=1) signal value, only if the operand in the B-Register has a higher magnitude than the operand in the A-Register. Utilizing the "overflow" signals enables the ONE STEP BINARY SUMMARIZER circuit's subtractor function to double up its functionality as a fast comparator, without any additional logic circuits or components. These "overflow" comparator signals compare the two input operand's Absolute Values, regardless of their dedicated signs.

The Operation Control Unit (FIG. 3A) is connected to every OSBS Unit (FIG. 2L). FIG. 2L is an exemplary illustration of the OSBS Unit of the present invention, which executes addition, subtraction, and magnitude comparison operations on two input operands. The Summarizer Module (FIG. 2L 240) of the present invention functions in "parallel" mode for addition, subtraction and comparison as well. All input bits are evaluated at the same time, but the processing or execution must allow time (2 gate delays for each bit) for the carry bits to complete their task. The operands may be comprised of N-digits, represented as A register operand: $A=A_N$, where N is the actual total number of digits in the operand A, and B register operand: $B=B_N$, where N is the actual total number of digits in the operand B. Accordingly, the coefficients of the operands with descending significance can be written as follows:

$A=A_N=A_{N-1}, A_{N-2}, A_{N-3} \ldots A_{N-X} \ldots A_{N-N}$
$B=B_N=B_{N-1}, B_{N-2}, B_{N-3} \ldots B_{N-X} \ldots B_{N-N}$ where each subscripted letter represents one of the digits in the operand. For example, if the operand $A_{N=4}$ is a four digit operand, then the subscripted letters represent each digit within operand $A_4=A_3 A_2 A_1 A_0$, such as $A_4=1001$, where $A_3=1, A_2=0, A_1=0,$ and $A_0=1$. The "X" in FIGS. 2J to 2L, and throughout the description represent the current digit, with "X-1" representing the previous adjacent lower digit-bit. That is, the previous Carry Bit (ARB Sub Carry Bit X-1 or BRB Sub Carry Bit X-1 or ADD Carry Bit X-1) will modify the result of the current C-Register bit (C-Reg Bit X). The selection of the active C-Register modifier Carry Bit depends on the current function of the ONE STEP BINARY SUMMARIZER circuit. In addition mode the ADD Carry bit will modify the result of the C-Register via the second XOR logic function gate 204 of the Summarizer Module. In subtraction mode the operand's Sub Carry Bit, which has the lower absolute magnitude will be the C-register modifier, and it is always the subtrahend—determined by the "intelligent self-selection" of the final bit's Sub Carry signals.

Figure 4A:
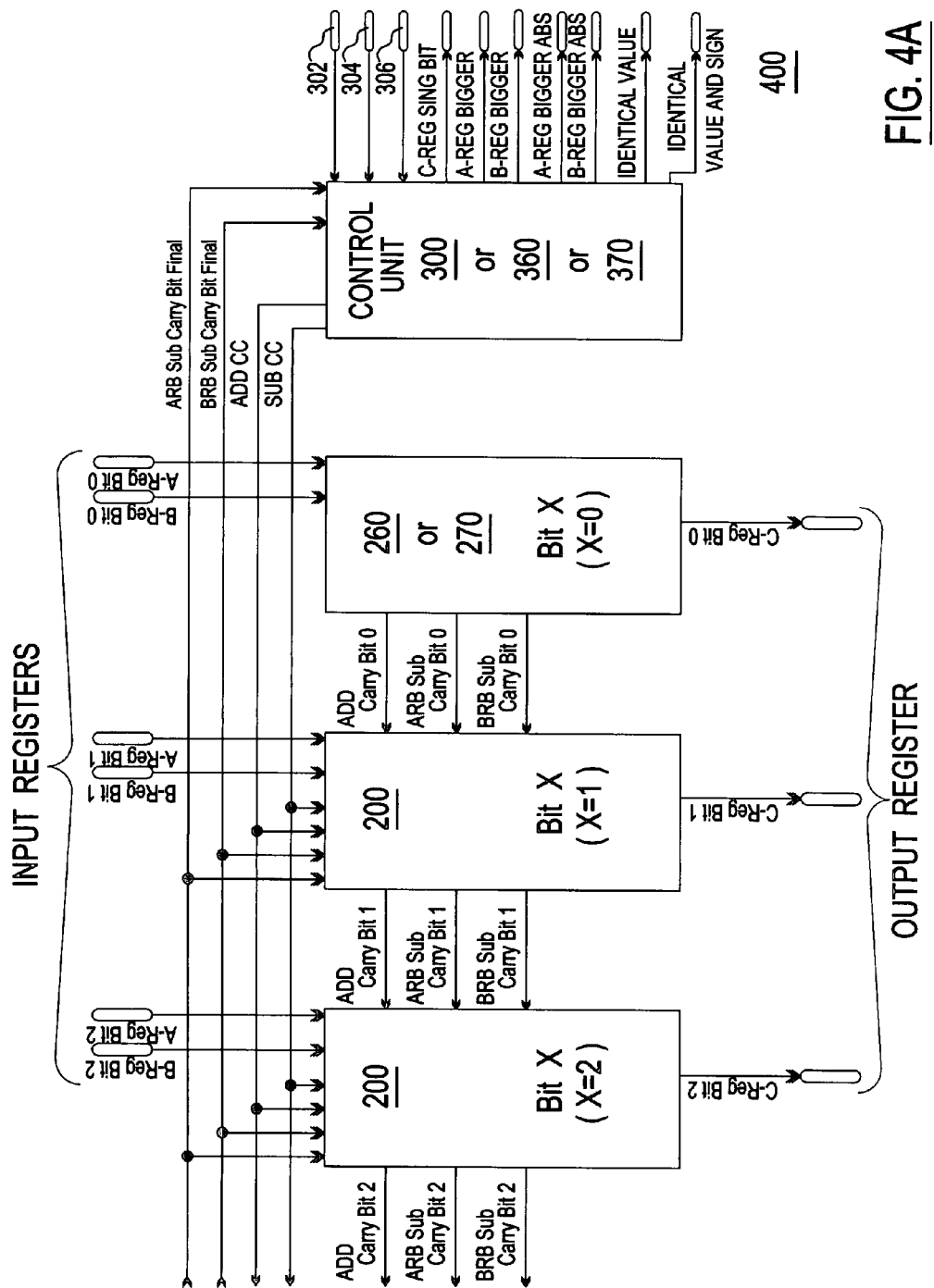
FIG. 4A is an exemplary Block Diagram illustration of multi-bit ONE STEP BINARY SUMMARIZER circuit using the first three bits, Bit 0, Bit 1, Bit 2 and the Operation Control Unit as illustrated in FIG. 2L, FIG. 2M, FIG. 2N, FIG. 3A, FIG. 3C and FIG. 3D in accordance with the present invention.
Figure 4B:
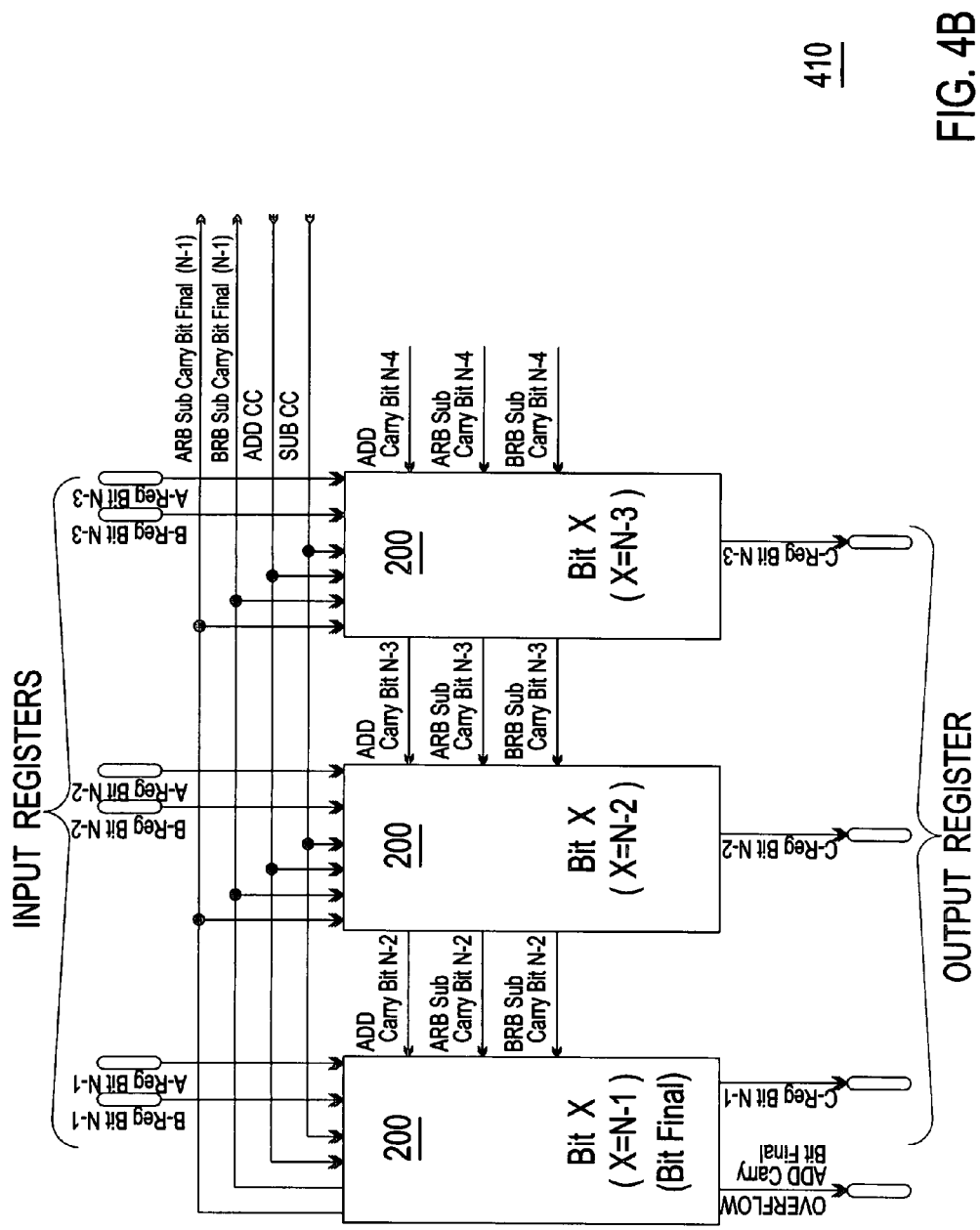
FIG. 4B is another exemplary Block Diagram illustration of multi-bit ONE STEP BINARY SUMMARIZER circuit using the Final three bits, Bit N-1, Bit N-2 and Bit N-3 as illustrated in FIG. 2L in accordance with the present invention.

The circuits illustrated in FIGS. 2L and 3A are not practical for use in larger logic diagrams that may use 16, 32, 64 or 128-bit summarizers, and therefore, a simplified "block diagram" such as that of FIGS. 4A and 4B are used to represent a multi-bit ONE STEP BINARY SUMMARIZER circuit 400 and 410. The multi-bit ONE STEP BINARY SUMMARIZER circuit 400 includes a Operation Control Unit—the Operation Control Unit (300) shown in FIG. 3A, or the simplified Operation Control Unit (360) shown in FIG. 3C, or the mandatory Operation Control Unit (370) shown in FIG. 3D. The multi-bit ONE STEP BINARY SUMMARIZER circuit 400 also includes one OSBS Unit (FIG. 2M circuit 260 or FIG. 2N circuit 270) that represents the first bit (Bit 0) and two identical or equivalent components OSBS Unit 200 shown in FIG. 2L that represent the second and third bits (Bit 1 and Bit 2). The multi-bit ONE STEP BINARY SUMMARIZER circuit 410 includes similar corresponding or identical components as the OSBS Unit 200 that shown in FIG. 2L, represent the high order three bits, including the final bit. Most circuits were described above, therefore, for the sake of brevity, clarity, convenience, and to avoid duplication, the general description of FIG. 4A and FIG. 4B will not repeat every corresponding or equivalent component that has already been described above in relation to the OSBS Unit 200 and the Operation Control Unit 300.

As FIG. 4A illustrates, regardless of the number of bits used, no more than one Operation Control Unit should be incorporated with the multi-bit ONE STEP BINARY SUMMARIZER circuit, either FIG. 3A circuit 300 or FIG. 3C circuit 360 or FIG. 3D circuit 370, depending on whether the Operation Control Unit 300 is used or not used. Also no more than one Bit 0 is used with the multi-bit ONE STEP BINARY SUMMARIZER circuit, either FIG. 2M circuit 260 or FIG. 2N circuit 270, depending on whether the unused gates are simply grounded, as illustrated in the circuit FIG. 2N 270, or removed from the circuit as illustrated in FIG. 2M 260. In this exemplary case, the multi-bit ONE STEP BINARY SUMMARIZER circuit is shown to illustrate the plurality of the OSBS Unit 200, which when cascaded together, form the multi-bit ONE STEP BINARY SUMMARIZER circuit. Each bit of the input registers (A-Register and B-Register) is processed in parallel through a corresponding OSBS Unit 200, with a corresponding output bit indicated in the resultant C-Register.

Referring now to FIG. 3D, although it is preferable to use the Operation Control Unit 300, FIG. 3D circuit 370 is an exemplary illustration of a ONE STEP BINARY SUMMARIZER circuit's Operation Control Unit 300 that does not use the Operation Control Unit 300. However, it is a necessity to utilize a minimum portion of the Control Unit 300. That is, the ONE STEP BINARY SUMMARIZER circuit requires at least the operation selector input (Addition or Subtraction mode). It should be noted, that in this case, both input operands must be unsigned (must be positive) and the resultant operand's polarity must be indicated (the C-Register is a positive or negative number).

As illustrated in FIG. 3D circuit 370, the signal values of the ADD CC and the SUB CC lines are directly manipulated and coupled to the OSBS Units 200. The ADD CC is a strait in signal. The SUB CC signal is an inverted ADD CC (complement) connected via an INV function logic gate 308, rather than determined by the combinational logic circuit of the Operation Control Unit 300. The input of the INV function logic gate 308 is the initial operation selector input 302, which defines the ADD CC signal line and the output of the INV function logic gate 308 is the SUB CC signal line. The SUB CC signal line is also coupled to one of the input pins of the NAND function logic gate 364, the output of which is the C-REG SIGN BIT output signal. The other input of the NAND function logic gate 364 is coupled with the BRB Sub Carry Bit Final signal. In this reduced functionality, the B-register must be the subtrahend. The output of the NAND function logic gate 364 will be a low logic level (=0), indicating a negative result for the C-Register, only when the ONE STEP BINARY SUMMARIZER circuit is in a subtraction mode, and the subtrahend (B-Register) is larger than the minuend, (the A-Register).

As illustrated in FIG. 3C, the comparator function of the ONE STEP BINARY SUMMARIZER circuit can be utilized without the use of the fully populated Operation Control Unit 300 by replacing the Operation Control Unit 300 with FIG. 3C circuit 360. FIG. 3C circuit 360 is similar to FIG. 3D circuit 370, but includes some of the comparator functions. This circuit utilizes both of the Sub Carry Final bits (ARB Sub Carry Bit Final and BRB Sub Carry Bit Final). The ARB Sub Carry Bit Final is connected to an output pin as A-REG BIGGER ABS and the BRB Sub Carry Bit Final is connected to an output pin as B-REG BIGGER ABS. The ARB Sub Carry Bit Final is also connected to one of the input pins of the XNOR logic function gate 362. Similarly, the BRB Sub Carry Bit Final is connected to the second input pin of the XNOR logic function gate 362. The output of the XNOR logic function gate 362 is the IDENTICAL VALUE signal, which is high (−1) if both of the input operands have identical magnitudes. The IDENTICAL VALUE signal is set to low (=0) if two input operands have different magnitudes. Similarly, as illustrated in FIG. 3D, the signal values on the ADD CC and the SUB CC signal lines are directly manipulated and coupled to the OSBS Units 200. The ADD CC is a strait in signal. The SUB CC signal is an inverted ADD CC (complement) connected via an INV function logic gate 308. As to the remaining functionality of the Operation Control Unit 300, a software application should replace the various functionalities of the Operation Control Unit 300. However, the combination of the ONE STEP BINARY SUMMARIZER circuit and the set of instructions, replacing the various functions of the Operation Control Unit 300, which must be read, evaluated, and executed, will result in a slower performance compared with the hard-wired version illustrated in FIGS. 2L and 3A. The requirements for these instruction sets or micro codes are well known, but the actual program codes may vary from manufacturer to manufacturer.

Although the invention has been described in considerable detail in language specific to structural features and/or method acts, it is to be understood that the invention defined in the appended claims is not necessarily limited to the specific features or acts described. Rather, the specific features and acts are disclosed as the preferred forms of implementing the claimed invention. Therefore, while exemplary illustrative embodiments of the invention have been described, numerous variations and alternative embodiments will occur to those skilled in the art. For example, all circuit components illustrated and described are technology independent. That is, all circuit components may be implemented using any technology, non-limiting examples of which may include Transistor, Field Effect Transistor (FET), Transistor Transistor Logic (TTL), Emitter Coupling Logic (ECL), Complementary Metal Oxide Semiconductors (CMOS), etc., or any combination thereof. Some logic gates are available with both high and low level outputs, eliminating the need of an inverter. Such variations and alternate embodiments can be made, without departing from the spirit and scope of the invention.

It should be noted that reference to "first," "second," "third," etc. members throughout the disclosure, including the claims, are not used to show a serial or numerical limitation but instead are used to distinguish or identify the various members of the group.

What is claimed is:

1. A One Step Binary Summarizer circuit comprising:
An Operation Control Unit for selecting one of an addition operation and a subtraction operation that is applied to two input operands, said Operation Control Unit including:
a Decoder Module having a combinational circuit that converts information from N input lines to M separate, distinct, and mutually exclusive combination output lines, wherein N and M are digit numbers, with N<M, and wherein (numeric base)$^N$=M; and wherein the numeric base is binary, with N=3, and M=8;
an operation control module coupled to the decoder module for generating signal indicating the selected one of addition operation and a subtraction operation;
a resultant operand Sign Bit Generator Module coupled with the decoder module for determining a sign of a resultant operand; and
a Magnitude and Sign Module, which determines and displays if the input operands are identical, and if they are identical in both value and sign; and if they are not identical, which input operand has higher absolute value and which input operand has higher relative value; and
one or more One Step Binary Summarizer Units coupled to the Operation Control Unit for performing said selected one operation.

2. The One Step Binary Summarizer circuit according to claim 1, wherein the One Step Binary Summarizer Unit comprising:
a Summarizer Module for executing the selected operation on the operands; and
a Carry Control Module for determining a carry for the operands for both addition and subtraction operation.

3. The One Step Binary Summarizer circuit according to claim 2, wherein the Summarizer Module comprising:
a first logic function unit for comparing the two input operands; and
a second logic function unit coupled to the first logic function unit for comparing the outputs of the first logic function unit and an applicable addition or subtraction carry signals from a previous bit's operation to output a result signal as an output operand.

4. The One Step Binary Summarizer circuit according to claim 2, wherein the Summarizer Module's logic gate components are shared between the addition and subtraction operations.

5. The One Step Binary Summarizer circuit according to claim 2; wherein the Carry Control Module comprising:
three identical, independent Sub-Modules, which operate simultaneously, wherein the first Sub-Module is a Carry Generator Sub-Module for generating a first carry associated with an addition, the second Sub-Module is a Carry Generator Sub-Module for generating a second carry associated with a subtraction of the first operand from the second operand, and the third Sub-Module is Carry Generator Sub-Module for generating a carry associated with a subtraction of the second operand from the first operand, and
a Carry Selector Sub-Module coupled to the three Sub-Modules for selecting one of the generated carries.

6. The One Step Binary Summarizer circuit according to claim 5, wherein all said Carry Generator Sub-Modules simultaneously pass the carry results to the next adjacent higher bit for processing.

7. The One Step Binary Summarizer circuit according to claim 5 further receiving two Final Bit's subtraction carry signals indicating the higher absolute value of the input operands; wherein only one of the Final Bit's subtraction carry signal can have a high logic level at any given time; and the two subtraction carry signals of the Final Bit can have a low logic level at the same time only if the two input operands have an identical absolute value.

8. The One Step Binary Summarizer circuit according to claim 7, wherein an addition and two subtractions on the input operands are simultaneously executed; and wherein, in the addition operation, the first carry are passed to the Summarizer Module via the Carry Selector Sub-Module; and in the subtraction operation, the Final Bit's high-level subtraction carry signal self-selects the applicable subtraction's carry signal to be passed to the Summarizer Module via the Carry Selector Sub-Module.

9. The One Step Binary Summarizer circuit according to claim 7; wherein, in the subtract operation, the One Step Binary Summarizer circuit subtracts the smaller magnitude operand from a larger magnitude operand based on two Final Bit's subtraction carry signals.

10. The One Step Binary Summarizer circuit according to claim 1, wherein for the subtraction operation, the One Step Binary Summarizer circuit utilizes a subtraction-by-addition method (carry concept) instead of the traditional subtraction by borrowing method.

11. The One Step Binary Summarizer circuit according to claim 10, wherein, in the subtraction operation, the carry is generated when the minuend operand has a low logic level and the subtrahend operand has a high logic level, or the two input operand have identical logic levels and a carry form the previous bits operation his a high logic level.

12. The One Step Binary Summarizer circuit according to claim 1, wherein the delay of the One Step Binary Summarizer circuit depends only on the electronic technology used for the construction of the circuit, regardless of whether it is in addition or subtraction mode at any given time; and independent from the absolute values and the signs of the input operands; and equal to (N*2GD)+2GD; where N is the total number of bits used by the operands and GD is a gate delay.

* * * * *